US006494627B2

(12) United States Patent
Mori et al.

(10) Patent No.: US 6,494,627 B2
(45) Date of Patent: Dec. 17, 2002

(54) IMAGE-RECORDING APPARATUS

(75) Inventors: Nobufumi Mori, Kanagawa (JP); Akinori Harada, Kanagawa (JP); Shun-ichi Ishikawa, Kanagawa (JP); Shintaro Washizu, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/844,276

(22) Filed: Apr. 30, 2001

(65) Prior Publication Data

US 2002/0018188 A1 Feb. 14, 2002

(30) Foreign Application Priority Data

May 1, 2000 (JP) ....................................... 2000-132640

(51) Int. Cl.[7] ................................................ G03B 13/00
(52) U.S. Cl. ....................................... 396/575; 355/400
(58) Field of Search ................................ 396/575, 578; 355/30, 27–29, 40, 400, 402, 405, 18; 219/216; 250/319; 430/348–355

(56) References Cited

U.S. PATENT DOCUMENTS 3,570,353 A * 3/1971 Berg .......................... 396/579
4,853,743 A * 8/1989 Nagumo et al. ............ 355/401
5,510,871 A * 4/1996 Biegler et al. .............. 396/575

* cited by examiner

*Primary Examiner*—D. Rutledge

(57) ABSTRACT

An image-recording apparatus including a casing section that encases a light and heat sensitive recording material therein; an optical recording section that exposes to light a light and heat sensitive recording material fed from the casing section, and thereby records a latent image thereon; a thermal developing section that develops the latent image with heat; a moisture content-controlling section that controls moisture content of the light and heat sensitive recording material after exposure and before development; and an optical fixing section that fixes the developed image by irradiating it with light. The image-recording apparatus can be a completely dry system that is capable of forming good print images without producing waste materials such as image transfer sheets. By controlling moisture content of the recording material, problems such as mottling of images can be prevented.

16 Claims, 9 Drawing Sheets

IMAGE-RECORDING APPARATUS

BACKGROUND OF THE INVENTION

1. Field of the Invention

The present invention relates to an image-recording apparatus, more precisely to an image-recording apparatus for recording an image on a light and heat sensitive recording material.

2. Description of the Related Art

In conventional photo-recording systems such as, typically, those for silver photography, films such as negative or positive films are exposed to light to form images thereon, and then developed. The image information thus recorded on the developed films is optically printed on printing paper, which is then processed with a processing solution to obtain prints. Color negative films generally have a layer to be exposed to blue light to form a yellow color image thereon, a layer to be exposed to green light to form a magenta color image thereon, and a layer to be exposed to red light to form a cyan color image thereon. In a developing process, latent image-bearing silver halide grains in the film are reduced to silver while a developer used is oxidized, and the oxidized product is reacted with a coupler (coupling reaction) to form a color image. The non-developed silver halides and the developed silver are removed with a bleach-fixer in a bleach-fixing process that follows the developing process. Then, color printing paper is exposed to light through the resulting negative color image, and developed, bleached and fixed in the same manner as above to obtain a color print. Hence, most conventional photo-recording systems are wet systems that use processing solutions. Therefore, processing apparatuses are large, and processing costs are often high.

On the other hand, a simple and rapid method has been developed for processing silver halide photographic materials through thermal development. For this method, some systems are commercially available on the market, such as Fuji Photo Film's Pictrography and Pictrostat. However, this method of thermal development requires a process of transferring dyes formed through thermal development onto an image-receiving material to give prints, and a drawback is that it produces waste material.

Given this situation, a mono-sheet type, light and heat sensitive recording material capable of forming a latent image thereon through exposure to light and capable of being processed by heat to develop the latent image is now attracting much attention in the art, with hopes of constructing a completely dry system for image formation that does not produce waste material. However, the light and heat sensitive recording material is still problematic in that it contains moisture and other volatile substances, and images printed thereon are often mottled because of the moisture and other volatile substances in the recording material. It is thought that moisture and the like in the recording material vaporize when the recording material is developed by heating, and locally adhere onto the recording surface of the material, whereby the thermal sensitivity of a moisture-adhered portion is lowered, which causes mottling of the printed image. This problem of mottling can be solved by prolonging the time for development, but this leads to another problem in that the image-recording system is not convenient.

SUMMARY OF THE INVENTION

An object of the present invention is to solve the above-mentioned problems, and to provide an image-recording apparatus for a completely dry system that is capable of forming good print images with no mottling and without producing waste materials.

To attain the object described above, the present invention provides an image-recording apparatus that includes: a casing section which encases a light and heat sensitive recording material; an optical recording section, downstream of the casing section, which exposes the light and heat sensitive recording material, which has been fed from the casing section, for recording a latent image; a thermal developing section, downstream of the optical recording section, which develops the latent image by heating; a moisture content-controlling section, upstream of the thermal developing section, which controls moisture content of the light and heat sensitive recording material after exposure; and an optical fixing section, downstream of the thermal developing section, which irradiates light for fixing a developed image.

In the apparatus of the present invention, a light and heat sensitive recording material is fed from the casing section to the optical recording section, in which it is exposed to light to thereby have the latent image recorded thereon. In the apparatus, the moisture content of the light and heat sensitive recording material is controlled in the moisture content-controlling section after exposure and before development, and the latent image formed on the recording material is thereafter developed by heating in the thermal developing section. Then, the developed image is irradiated with light in the optical fixing section and is thus fixed on the recording material. In this manner, the latent image formed on the recording material is thermally developed, and the thus-developed image is then optically fixed thereon through irradiation with light, and the process does not require a processing solution or an image-receiving member. Accordingly, in this image-recording apparatus, images can be recorded on recording materials with a completely dry system, and no waste materials are left after the process of image formation. In addition, in this apparatus, the moisture content of the light and heat sensitive recording material is controlled in the moisture content-controlling section after exposure and before development. Therefore, the moisture content of the recording material can, before the material is thermally developed, be controlled suitably so as to prevent uneven development. Because the recording material does not contain enough moisture to cause uneven development, the recording material can be uniformly developed by heating, to provide good images with no mottled printing thereon.

In one embodiment of the present invention, the moisture content-controlling section includes at least one of a heating device that heats the light and heat sensitive recording material and a moistening device that moistens the light and heat sensitive recording material.

Ordinary light and heat sensitive recording materials are free from the problem of uneven development in thermal development when moisture content thereof is low. For controlling the moisture content, therefore, these ordinary light and heat sensitive recording materials are heated by a heating device to remove moisture and thereby reduce the moisture content. However, some light and heat sensitive recording materials perform better when containing a certain amount of moisture. Therefore, for controlling the moisture content, these light and heat sensitive recording materials are moistened by a moistening device to give moisture and increase the moisture content. By using both a heating device and a moistening device, the moisture content of a light and heat sensitive recording material can be decreased or increased in any desired manner.

In another embodiment of the present invention, the moisture content-controlling section includes a moisture content-measuring device that measures the moisture content of the light and heat sensitive recording material for generating a measurement signal; and a moisture content-controlling device that controls the moisture content of the light and heat sensitive recording material by at least one of heating and moistening, on the basis of the measurement signal of the moisture content-measuring device.

In the moisture content-controlling section, the moisture content-measuring device is for measuring the moisture content of the exposed light and heat sensitive recording material; and the moisture content-controlling device is for controlling the moisture content of the recording material by heating and/or moistening the recording material on the basis of signals from the moisture content-measuring device. In this embodiment of the present invention, the moisture content-controlling device functions to control the moisture content of the exposed light and heat sensitive recording material on the basis of the signals from the moisture content-measuring device. Thus, the recording material is heated when the moisture content is high, and when its moisture content is low, the exposed light and heat sensitive recording material is not heated but may be moistened. Thus, the moisture content of the exposed light and heat sensitive recording material is well controlled before the recording material is developed by heating.

In still another embodiment of the present invention, the exposed light and heat sensitive recording material is heated from a side thereof which is opposite to an exposure surface side thereof.

When the exposed light and heat sensitive recording material is heated, moisture is evaporated away through its exposed surface, which has recording layers and other layers thereon. Therefore, when the material is heated from the side opposite to the exposed surface, as in this embodiment, the moisture is more readily evaporated away. Accordingly, the moisture content-controlling treatment can be effected within a short period of time, and good print images can be efficiently obtained.

In still another embodiment of the present invention, the moisture content-controlling device controls the moisture content of the light and heat sensitive recording material such that a measurement value from the moisture content-measuring device approaches a setting value.

A desired value of the moisture content of the light and heat sensitive recording material to be processed in the apparatus of the present invention is preset, and the moisture content of the recording material is, after exposure to light, controlled by the moisture content-controlling device such that the moisture content values measured by the moisture content-measuring device get closer to the desired value. For example, when a measured value is higher than this preset value, the recording material is heated, and when the measured value is lower than the preset value, the recording material is not heated.

In still another embodiment of the present invention, the apparatus is equipped with an exhaust device that sucks and discharges vapors.

In this embodiment, vapors from the heated light and heat sensitive recording material are discharged through the exhaust section by suction, and are therefore prevented from staying in or condensing in the apparatus, and causing problems in the apparatus. Accordingly, the apparatus of this embodiment assures stable image formation.

The light and heat sensitive recording material to be processed in the image-recording apparatus of the present invention may contain a photo-curable composition. A recording material of this type is exposed to light that has passed through or been reflected by an image original, or is exposed to light through optical scanning of image data. Thus, the photo-curable composition in the recording material is photo-cured to form a latent image on the recording material. The recording material is then heated, and a color-forming or color-erasing component in a non-cured portion, depending on the latent image formed, moves inside the recording material to thereby form a color image. In addition, when the surface of the recording material is irradiated with light, the image formed is cured and fixed thereon, and any unnecessary coloring component is eliminated. This image-recording process is useful not only for recording black-and-white images but also for recording color images. The light and heat sensitive recording material of this type may have any of light and heat sensitive recording layers (a) to (f) mentioned below.

A photosensitive thermal layer (a) contains 1) thermally-responsive microcapsules which encapsulate a color-forming component A and, outside the microcapsules, 2) a photo-polymerizable composition which contains at least i) a compound B which is substantially colorless and has, within the same molecule, a polymerizable group and a site which reacts with the color-forming component A to form color, and ii) a photoinitiator.

A light and heat sensitive recording layer (b) contains 1) thermally-responsive microcapsules which encapsulate a color-forming component A and, outside the microcapsules, 2) a photo-polymerizable composition which contains at least i) a substantially colorless compound C which reacts with the color-forming component A to form color, ii) a photo-polymerizable compound D and iii) a photoinitiator.

A light and heat sensitive recording layer (c) contains 1) thermally-responsive microcapsules which encapsulate a color-forming component A and, outside the microcapsules, 2) a photo-polymerizable composition which includes at least i) a substantially colorless compound C which reacts with the color-forming component A to form color, ii) a photo-polymerizable compound Dp which has a site that suppresses the reaction of the color-forming component A with the compound C, and iii) a photoinitiator.

A light and heat sensitive recording layer (d) contains 1) thermally-responsive microcapsules which encapsulate a substantially colorless compound C which reacts with a color-forming component A to form color and, outside the microcapsules, 2) a photo-polymerizable composition which contains at least i) the color-forming component A, ii) a photo-polymerizable compound D and iii) a photoinitiator.

A photo-curable photosensitive thermal layer (e) includes an oxidant precursor E which is encapsulated in thermally-responsive microcapsules, an activator G which exists outside the thermally-responsive microcapsules and which reacts with the oxidant precursor E to generate an oxidant F, and a dye forming coupler H which couples to the oxidant F to generate a dye. By irradiation of light, an irradiated portion of the light and heat sensitive recording layer (e) is cured.

A light and heat sensitive recording layer (f) includes the oxidant precursor E outside thermally-responsive microcapsules, the activator G which is encapsulated in the thermally-responsive microcapsules and which reacts with the oxidant precursor E to generate the oxidant F, and the dye forming coupler H which couples to the oxidant F to form a dye. By irradiation of light, an irradiated portion is cured.

DETAILED DESCRIPTION OF THE PREFERRED EMBODIMENTS

Some embodiments of the present invention as applied to color image formation on a color-photographic thermal recording material are described herein under with reference to the drawings attached hereto. In the color image-recording apparatus illustrated, the recording material to be processed has three monochromatic light and heat sensitive recording layers (hereinafter referred to as "recording layers") laminated on a support. In the material, each recording layer is processed to give one of the colors yellow, magenta and cyan.

First Embodiment

Figure 1:
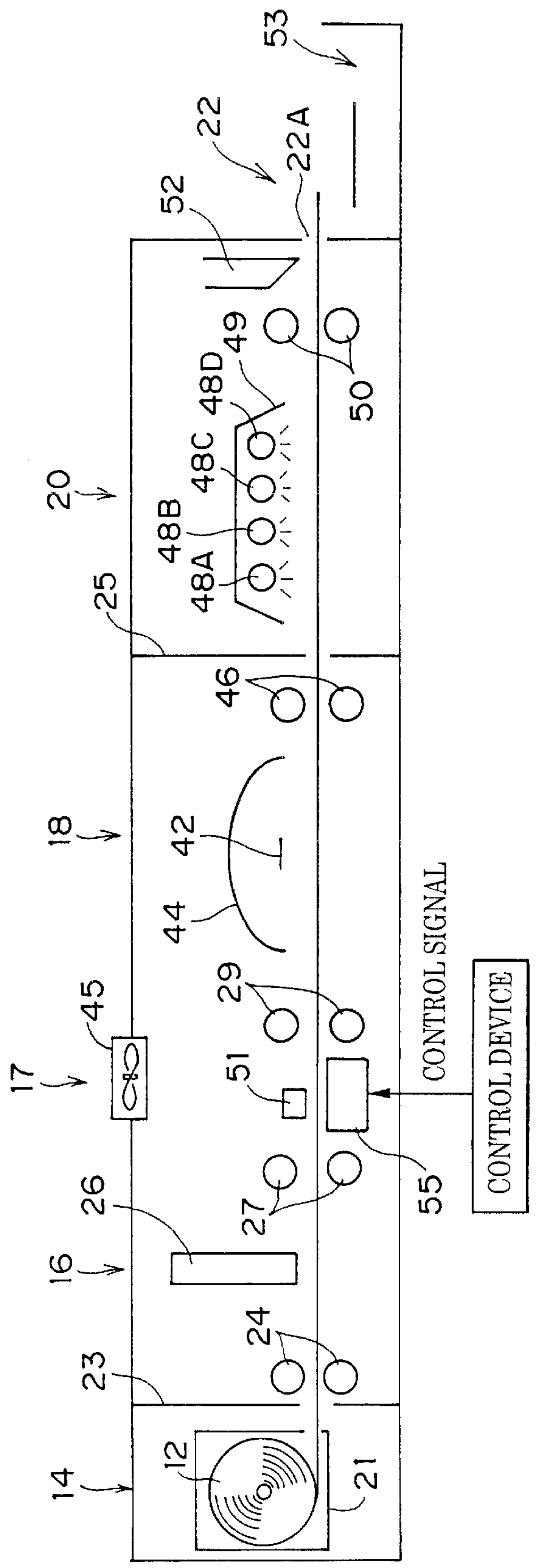
FIG. 1 is a schematic view showing an outline of an image-recording apparatus of a first embodiment of the present invention, wherein 12 is a light and heat sensitive recording material; 14 is a casing section; 16 is an optical recording section; 17 is a moisture content-controlling section; 18 is a thermal developing section; 20 is an optical fixing section; 22 is a receiver section; 22A is an outlet; 26 is a light beam scanning device; 42 is a far infrared heater; 48A, 48B, 48C and 48D each are a fixation light source; 51 is a moisture content sensor; 52 is a cutter; 53 is a print tray; 55 is a plate heater; and 57 is a control section.

FIG. 1 shows an outline of the constitution of an image-recording apparatus of a first embodiment of the present invention, in which the light and heat sensitive recording material 12 to be processed is wound up in a roll. As in FIG. 1, a casing section 14 in which the light and heat sensitive recording material 12 is encased; an optical recording section 16 in which the light and heat sensitive recording material 12 fed from the casing section 14 is exposed to light to record a latent image thereon; a moisture content-controlling section 17 in which the moisture content of the light and heat sensitive recording material is controlled after exposure and before development; a thermal developing section 18 in which the latent image is developed under heat; an optical fixing section 20 in which the developed image is fixed through irradiation with light; and a receiver section 22 which receives the image-recorded material 12 are inside a housing of the image-recording apparatus. In the apparatus, the casing section 14, the optical recording section 16, the moisture content-controlling section 17, the thermal developing section 18, the optical fixing section 20, and the receiver section 22 are disposed in that order in a horizontal direction.

Between the adjacent sections, pairs of carrier rollers 24, 27, 29, 46 and 50 that nip the light and heat sensitive recording material 12 to carry it are disposed, and these carrier roller pairs 24, 27, 29, 46 and 50 form a traveling route along which the light and heat sensitive recording material 12 is carried from the casing section 14 toward the receiver section 22. The carrier roller pairs 24, 27, 29, 46 and 50 are connected with carrier driving sections (not shown), and are driven by the carrier driving sections.

The casing section 14 and the optical recording section 16 are partitioned by a wall 23 which has an opening through which the light and heat sensitive recording material 12 runs in a traveling direction thereof; and the thermal developing section 18 and the optical fixing section 20 are partitioned by a wall 25 having an opening through which the light and heat sensitive recording material 12 runs. The receiver section 22 has an outlet 22A through which the image-recorded material 12 is taken out into the receiver section 22. A cutter 52 is disposed in the optical fixing section 20 just before the outlet 22A, and cuts the light and heat sensitive recording material 12 into separate sheets, each having a recorded image region.

In the casing section 14, a magazine 21 is disposed. A roll of the light and heat sensitive recording material 12, which is wound up with its recording layer on the inside, is loaded in the magazine 21. The pair of carrier rollers 24 is disposed in the optical recording section 16, adjacent to the opening of the partition wall 23. Nipping the light and heat sensitive recording material 12 therebetween, the pair of carrier rollers 24 rotates, whereby the recording material 12 loaded in the magazine 21 in the casing section 14 is unwound and drawn out with a recording layer thereof facing upward. In this condition, the recording material 12 is carried along the predetermined traveling direction, and then reaches the optical recording section 16 which is disposed downstream in the traveling direction.

Figure 2:
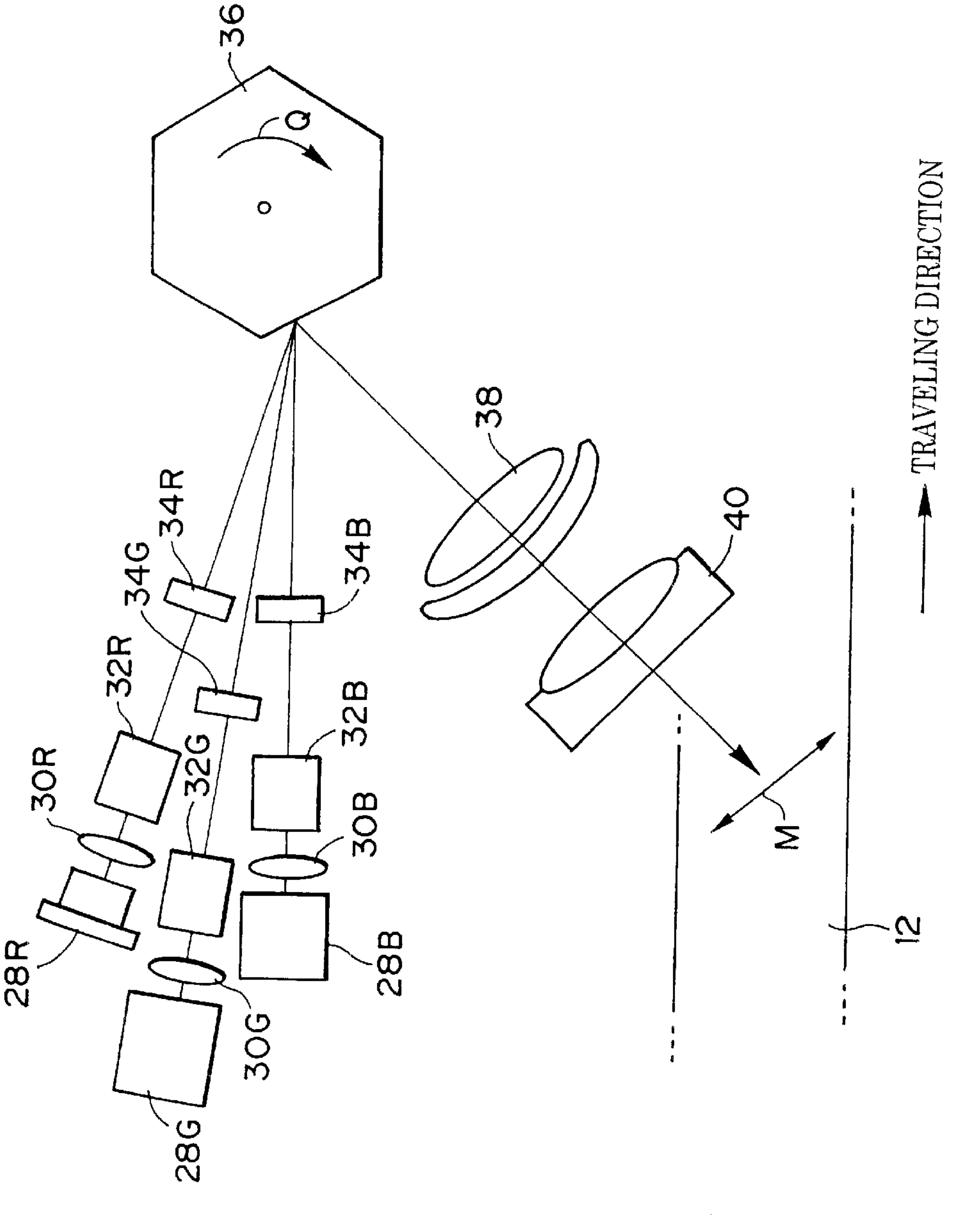
FIG. 2 is a schematic view showing a structure of a light beam scanning device for the image-recording apparatus relating to the first embodiment.

In the optical recording section 16, a light beam scanning device 26 is disposed above the recording material traveling route. As shown in FIG. 2, the light beam scanning device 26 is equipped with three color laser sources, a red laser source 28R, a green laser source 28G and a blue laser source 28B. These laser sources are equipped with photo-modulators 32R, 32G and 32B, respectively (these comprise collimator lenses 30R, 30G and 30B, respectively, and acoustic optical modulators (AOM)), and with cylindrical lenses 34R, 34G and 34B, respectively. The photo-modulators 32R, 32G and 32B are driven by separate modulator driving sections (not shown). A polygonal mirror 36, an fθ lens 38, and a cylindrical lens 40 are disposed at a light-emitting side of the cylindrical lenses 34R, 34G and 34B.

The laser sources 28R, 28G and 28B are not specifically defined. For these, besides ordinary semiconductor lasers, solid state lasers, fiber lasers, wavelength conversion solid state lasers, gas lasers, vertical-cavity surface-emitting lasers and the like are usable herein. Semiconductor lasers can be directly modulated without any need for an external modulator such as an AOM. As a semiconductor laser, group III nitride semiconductor lasers of such as GaN, InGaN, AlGaN, InGaAlN are preferably used.

The laser sources 28R, 28G and 28B may have a maximum intensity within a wavelength range of from 300 to 1100 nm. Suitable sources of light having a wavelength shorter than 300 nm are not available, and inexpensive systems for such short wavelength light are difficult to design. Even when sources of light having a wavelength longer than 1100 nm are used, most light and heat sensitive recording materials sensitive to such long wavelength light are unstable, and it is difficult to design light and heat sensitive recording materials having long-term stability. Specifically, the laser sources 28B, 28G and 28R may have maximum intensities at wavelengths selected from a wavelength range of from 300 to 500 nm, a wavelength range of from 450 to 700 nm and a wavelength range of from 550 to 1100 nm, respectively. In this embodiment, for example, the red laser source 28R may be a semiconductor laser having a central oscillation wavelength of 680 nm; the green laser source 28G may be a semiconductor laser-excited wavelength conversion solid state laser having a central oscillation wavelength of 532 nm; and the blue laser source 28B may be a semiconductor laser-excited wavelength conversion solid state laser having a central oscillation wavelength of 437 nm.

Preferably, the maximum radiation energy of a recording light on the surface of the light and heat sensitive recording material 12 is between 0.01 and 50 $mJ/cm^2$, and more preferably between 0.05 and 10 $mJ/cm^2$. If the maximum radiation energy is larger than 50 $mJ/cm^2$, the system will take a long time for exposure and will therefore lose its convenience. In addition, the light sources will be large and their costs will therefore increase. On the other hand, the maximum radiation energy will have to be at least 0.01 $mJ/cm^2$, in consideration of the general sensitivity of the light and heat sensitive recording material 12. If the maximum radiation energy is smaller than 0.01 $mJ/cm^2$, even high-sensitivity light and heat sensitive recording materials will require a light-shielding section for shielding from external light. In this case, the cost of the optical recording section will increase.

The laser rays emitted by the laser sources 28R, 28G and 28B are made to run parallel with each other, having passed through the collimator lenses 30R, 30G and 30B, respectively, and then reach the photo-modulators 32R, 32G and 32B, respectively. Modulation signals are inputted into the photo-modulators 32R, 32G and 32B from modulator driving sections (not shown), and the intensity of each laser ray having entered the photo-modulators is individually modulated according to a modulation signal inputted into the photo-modulator. The laser rays whose intensities have been thus modulated by the photo-modulators 32R, 32G and 32B then reach the cylindrical lenses 34R, 34G and 34B, respectively, through which the laser rays are focused onto a surface of the polygonal mirror 36. The thus-focused laser rays are reflected from the surface of the polygonal mirror 36, corrected by the fθ lens 38 and the cylindrical lens 40, and thereafter dot-wise converged onto the light and heat sensitive recording material 12. The polygonal mirror 36 is rotationally driven by a polygonal mirror driving section (not shown), and is rotated in the direction of arrow Q at a predetermined peripheral speed. Accordingly, the light and heat sensitive recording material 12 is main-scanned in the direction of arrow M by the laser rays reflected on the polygonal mirror 36.

The pair of carrier rollers 27 is disposed downstream in the traveling direction from the optical recording section 16. The light and heat sensitive recording material 12 is nipped by the pair of carrier rollers 27 and conveyed along the traveling route, and reaches the thermal developing section 18 which is disposed further downstream in the traveling direction. As mentioned hereinabove, the light and heat sensitive recording material 12 is main-scanned by the laser rays reflecting from the surface of the polygonal mirror 36, while being sub-scanned in a direction opposite to the traveling direction. The light and heat sensitive recording material 12 is thus exposed to light, to have a latent image recorded thereon.

This apparatus is provided with an exposure controller (not shown) that reads analyzed image data from a frame memory of an image analyzer (not shown) and controls exposure of the light and heat sensitive recording material 12 on the basis of the analyzed image data. By this exposure controller, the polygonal mirror-driving section, the carrier rollers-driving sections and the modulator-driving sections are all controlled synchronously with exposure.

The moisture content-controlling section 17 has a moisture content sensor 51, which serves as a moisture content-measuring device and is disposed adjacent to the light and heat sensitive recording material 12; and a plate heater 55, which serves as a moisture content-controlling device, which is disposed below the traveling route. The plate heater 55 is connected with a control section 57, and is switched on and off in accordance with control signals from the control section 57. An IR sensor or the like can be used for the moisture content sensor 51.

Figure 3:
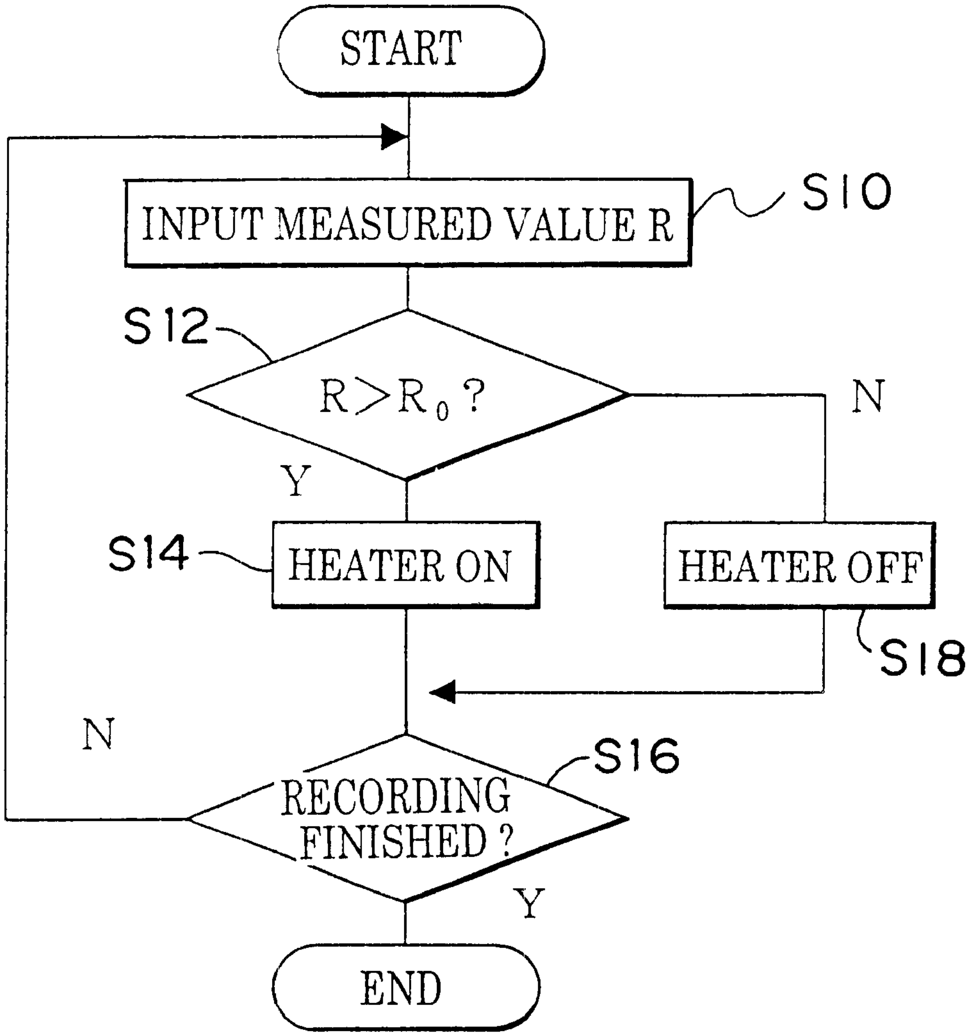
FIG. 3 is a flowchart showing a control routine for a moisture content-controlling device in a moisture content-controlling section.

Based on data detected by the moisture content sensor 51 and preset data, the control section 57 controls the plate heater 55. The control routine for the control section 57 is described below with reference to the flowchart shown in FIG. 3.

In step S10, a moisture content R detected by the moisture content sensor 51 is inputted to the control section 57. In step S12, it is judged whether or not the moisture content R is larger than a preset moisture content $R_0$. If the detected moisture content R is larger than the preset value $R_0$, the plate heater 55 is switched on in step S14. Consequently, the surface of a support of the light and heat sensitive recording material 12 (that is, the surface opposite to the exposed surface of the material) is heated by the plate heater 55 while the light and heat sensitive recording material 12 is being conveyed, moisture in the recording material 12 is thereby evaporated away, and the moisture content of the recording material 12 is reduced. On the other hand, if the detected moisture content R is smaller than the preset value $R_0$, the plate heater 55 is switched off in step S18. Control then proceeds to step S16.

In step S16, it is judged whether the process of image recording on the recording material 12 has finished or not. If the image recording is not yet finished, control returns to step S10, in which a new detected value is inputted to the control section. After this, the same control routine as above is repeated. When image recording has finished, the control routine finishes.

Figure 4A:
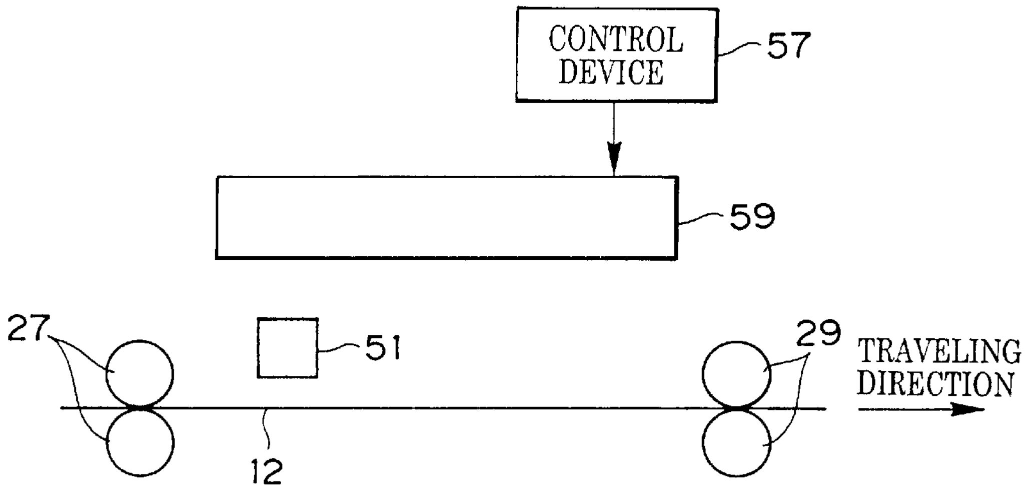
FIG. 4A is a schematic view showing another structural example of the moisture content-controlling section.

In this embodiment, the plate heater 55 serving as a heating device for the moisture content-controlling device is disposed below the traveling route. However, depending on the type of light and heat sensitive recording material to be processed, a humidifier 59, which serves as a moistening device of the moisture content-controlling device, may be disposed above the traveling route, as in FIG. 4A. With the humidifier 59, the light and heat sensitive recording material 12 may be moistened on the exposed surface thereof, to thereby increase the moisture content.

Figure 4B:
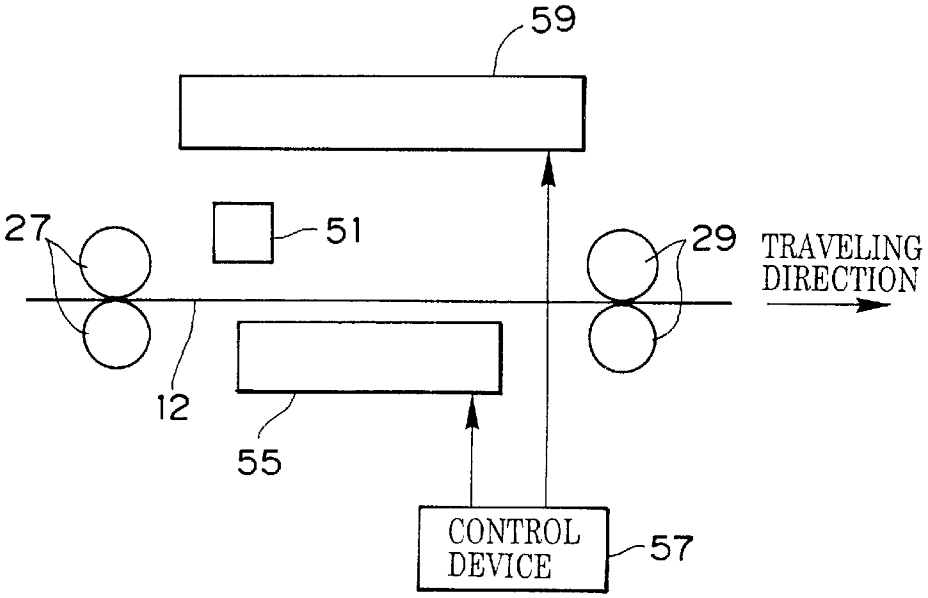
FIG. 4B is a schematic view showing another structural example of the moisture content-controlling section.

The moisture content-controlling device may have both the heating means and the moistening means disposed therein. For example, as shown in FIG. 4B, the plate heater 55 can be disposed below the traveling route, and the humidifier 59 above the traveling route. In this structure, switching between the plate heater 55 and the humidifier 59 can be suitably performed, depending on the detected moisture content of the recording material 12, and the moisture content of the recording material 12 can be decreased or increased in any desired manner.

Figure 5:
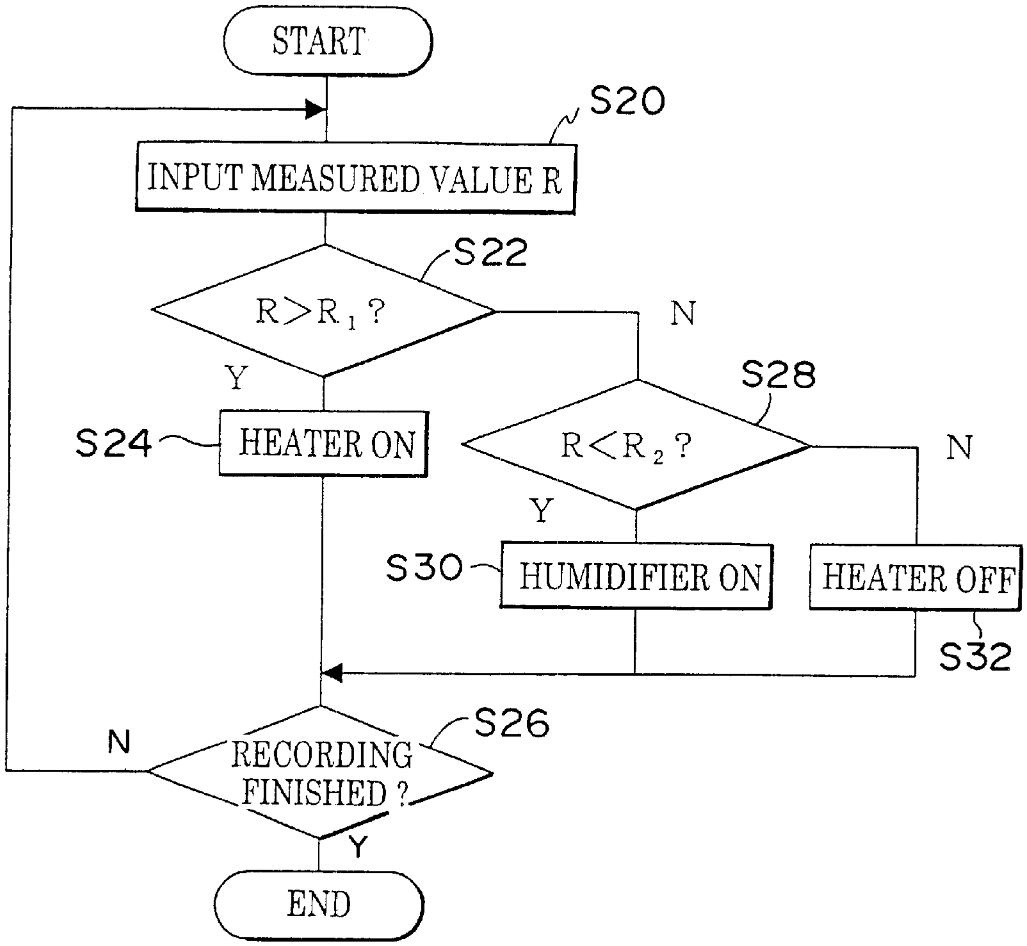
FIG. 5 is a flowchart showing a control routine for a moisture content-controlling device in the moisture content-controlling section shown in FIG. 4B.

The control routine for this embodiment is shown in FIG. 5. In step S20 in FIG. 5, the moisture content R detected by the moisture content sensor 51 is inputted to the control section 57. In step S22, it is judged whether or not the moisture content R is larger than a preset moisture content $R_1$. If the detected moisture content R is larger than the preset value $R_1$, the plate heater 55 is switched on in step S24.

On the other hand, if the detected moisture content R is smaller than the preset value $R_1$, it is judged whether or not the moisture content R is smaller than a lowermost limit $R_2$ of a preset range. If the moisture content R is smaller than the lowermost limit $R_2$, the humidifier 59 is switched on in step S30. However, if the moisture content R is within the preset range, both the plate heater 55 and the humidifier 59 are switched off in step S32. Thus, the moisture content R of the recording material 12 can be controlled all the time to stay within the preset range from $R_2$ to $R_1$.

In step S26, it is judged whether or not the process of image recording on the recording material 12 has finished. If the image recording is not yet finished, control returns to step S20, and a newly detected value is inputted to the control section 57. After this, the same control routine as above is repeated. When image recording has finished, the control routine is finished.

In this process, a heating temperature is lower than a temperature at which the light and heat sensitive recording material 12 is developed, and is preferably between 30 and 100° C. This is because if the recording material 12 were heated at a temperature at or above the development temperature, the recording material 12 would be developed before the moisture content reached the predetermined value, and uneven development of the recording material 12 could not be satisfactorily prevented.

An exhaust section 45 is disposed above the plate heater 55. Matter evaporated by heating the recording material 12 is discharged by suction via the exhaust section 45 to the outside. Specifically, the exhaust section 45 sucks up vapor, and a gas adsorptive filter provided inside the exhaust section 45 adsorbs the vapor. Thus, the vapor is removed from the system.

The pair of carrier rollers 29 is disposed downstream in the traveling direction from the moisture content-controlling section 17. After the moisture content has been controlled in the moisture content-controlling section 17, the light and heat sensitive recording material 12 is nipped by the pair of carrier rollers 29 and conveyed along the traveling route to reach the thermal developing section 18 which is disposed further downstream in the traveling direction.

The thermal developing section 18 is equipped with a far-infrared heater 42, which is disposed above the traveling route and serves as a heating device for heating the exposed surface of the light and heat sensitive recording material 12, and a reflector 44, which is disposed behind the far-infrared heater 42 and acts to reflect far-infrared rays from the heater 42 toward the light and heat sensitive recording material 12. The far-infrared heater 42 is controlled by a temperature controller (not shown) such that it can heat the light and heat sensitive recording material 12 up to a predetermined temperature, based on data from a temperature sensor (not shown) which is disposed near the light and heat sensitive recording material 12. In the thermal developing section 18, the light and heat sensitive recording material 12 is heated by the far-infrared heater 42 up to the predetermined temperature, and the latent image recorded on the recording material 12 is developed.

The heating temperature is at least a developing temperature of the light and heat sensitive recording material 12, and is preferably between 50 and 200° C., and more preferably between 90 and 140° C. If the heating temperature is lower than 50° C., the light and heat sensitive recording materials must be developable at the temperature lower than 50° C. However, storage stability before exposure to light of materials developable at such low temperatures is extremely poor, and stable light and heat sensitive recording materials that can accept such a low heating temperature are difficult to design. On the other hand, if the heating temperature is higher than 200° C., the support of the light and heat sensitive recording material 12 may deform under such high-temperature heating, and dimensional stability of the material cannot be ensured. Temperature fluctuations from the preset heating temperature are controlled to stay within a range of ±5° C. Light and heat sensitive recording materials generally have a relatively broad latitude for temperature fluctuation in thermal development, and can well ensure their properties given temperature fluctuations in thermal development that are within a range of ±5° C.

In this embodiment, an exhaust section is connected to the moisture content-controlling section. An additional exhaust section may also be connected to the thermal developing section so that moisture and the like that is generated in the process of thermal development can be removed from the system.

The pair of carrier rollers 46 are disposed downstream in the traveling direction from the thermal developing section 18. After development in the developing section 18, the light and heat sensitive recording material 12 is nipped by the pair of carrier rollers 46 and conveyed along the traveling route, and reaches the optical fixing section 20 which is disposed further downstream in the traveling direction.

The optical fixing section 20 is equipped with fixing light sources 48A, 48B, 48C and 48D, which emit light toward the image-forming surface of the developed light and heat sensitive recording material 12, and with a reflector 49, which is disposed behind the fixing light sources 48A, 48B, 48C and 48D. Here, the fixing light sources 48A, 48B, 48C and 48D are all disposed above the traveling route. In the optical fixing section 20, the developed light and heat sensitive recording material 12 is irradiated with light from the fixing light sources 48A, 48B, 48C and 48D, and the developed image is thus fixed on the light and heat sensitive recording material 12.

White light sources such as fluorescent lamps can be used for the fixing light sources 48A, 48B, 48C and 48D, and also any other of various light sources such as LEDs, halogen lamps, cold cathode ray tubes, lasers, etc. The illumination intensity of the light to be applied to the developed light and heat sensitive recording material 12 must be enough for optical fixing of the developed image, and is basically determined depending on the properties of the light and heat sensitive recording material 12. Preferably, the illumination intensity is between 10,000 and 50,000,000 lux·s, and more preferably between 20,000 and 6,000,000 lux·s. If the illumination intensity is smaller than 10,000 lux·s, the light will be not enough for optical fixing (optical erasure); and if larger than 50,000,000 lux·s, the lighting system will be large and costly, and will be inconvenient.

The pair of carrier rollers 50 is disposed downstream in the traveling direction from the optical fixing section 20. After being optically fixed in the optical fixing section 20, the image-recorded material 12 is nipped by the pair of carrier rollers 50 and conveyed along the traveling route toward the receiver section 22 which is disposed further downstream in the traveling direction.

A print tray 53 is provided adjacent to the outlet 22A of the receiver section 22. The long, unwound light and heat sensitive recording material 12, after having been continuously processed for exposure, development and fixing as described above, is cut into sheet prints with the cutter 52, which is provided in the optical fixing section 20, just before the outlet 22A. The sheet prints having passed through the outlet 22A are fed out to the print tray 53.

With this apparatus, all the steps for optical recording, thermal development and optical fixing of a light and heat sensitive recording material can be carried out in one apparatus. Specifically, in this apparatus, since the latent image formed on the recording material is thermally developed and the developed image thereon is optically fixed, no processing solution is needed. Therefore, this apparatus may be a completely dry system, and does not produce waste materials, because image-receiving members and the like are not needed.

Further, in this apparatus, the exposed light and heat sensitive recording material is heated in the moisture content-controlling section so as to evaporate moisture before development, whereby the moisture content is controlled suitably for preventing uneven development. Accordingly, the developed material is free from the problem of image mottling that is caused by moisture in thermal development. Further, since the recording material is heated on the surface opposite to the exposed surface, moisture can be evaporated away efficiently. Accordingly, the treatment for moisture content control of the recording material can be effected within a short period of time.

Moreover, in the moisture content-controlling section, the vapor from the heated light and heat sensitive recording material is discharged through the exhaust section by suction, and is therefore prevented from staying or condensing in the apparatus, and causing a breakdown of the apparatus.

In a case where semiconductor lasers are used for the red laser source and the blue laser source, the exposure system may be further reduced in size than in a case where solid state lasers are used therefor.

Second Embodiment

Figure 6:
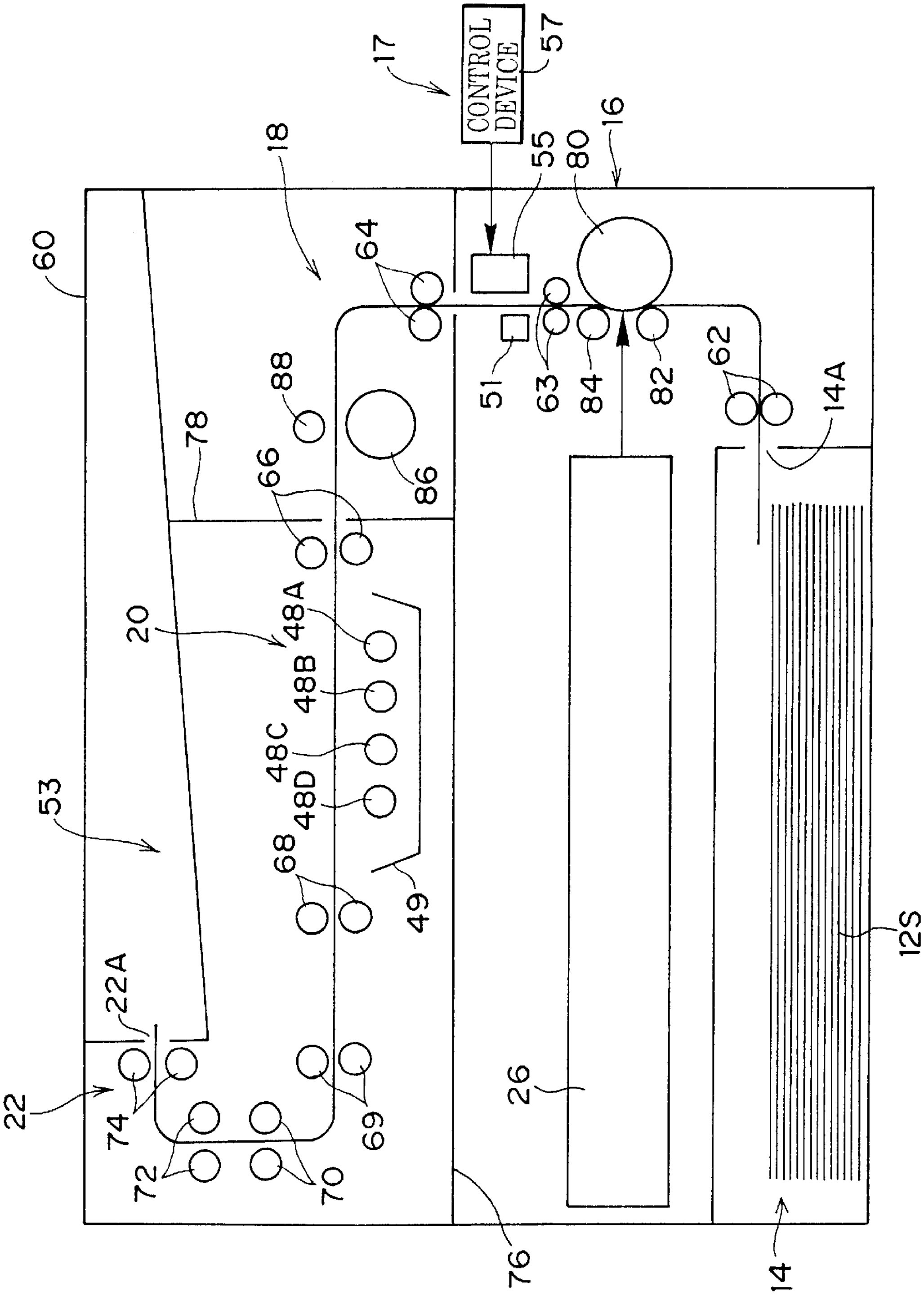
FIG. 6 is a schematic view showing a structure of an image-recording apparatus of a second embodiment, wherein 12S is a light and heat sensitive recording material; 80 is an exposure drum; 82 and 84 each are a nip roller; 86 is a drum heater; and 88 is a pressure roller

FIG. 6 shows an outline of the structure of an image-recording apparatus of a second embodiment of the present invention, in which light and heat sensitive recording sheets 12S are processed. As shown in FIG. 6, inside a housing of the image-recording apparatus are: the cassette-type casing section 14 in which the light and heat sensitive recording sheets 12S are encased; the optical recording section 16 in which the recording sheets 12S, which are fed one by one from the casing section 14, are exposed to light to record a latent image thereon; the moisture content-controlling section 17 in which the moisture content of the light and heat sensitive recording material is controlled after exposure and before development; the thermal developing section 18 in which the latent image is developed by heating; the optical fixing section 20 in which the developed image is fixed through irradiation with light; and the receiver section 22 which receives the recording sheets 12S. In this apparatus, the optical recording section 16 is above the casing section 14; the moisture content-controlling section 17 is above the optical recording section 16; the thermal developing section 18 and the optical fixing section 20 are above the moisture content-controlling section 17; and the receiver section 22 is above the optical fixing section 20.

Pairs of carrier rollers 62, 63, 64, 66, 68, 69, 70, 72 and 74 are disposed between the adjacent sections. These carrier roller pairs 62, 63, 64, 66, 68, 69, 70, 72 and 74 form a curved traveling route along which the light and heat sensitive recording sheets 12S are conveyed from the casing section 14 to the receiver section 22. These carrier roller pairs 62, 63, 64, 66, 68, 69, 70, 72 and 74 are connected with carrier driving sections (not shown), and are driven by the carrier driving sections.

The casing section 14, the optical recording section 16 and the moisture content-controlling section 17 are spaced from the other sections by a partition wall 76 that has an opening through which the light and heat sensitive recording sheets 12S run along a traveling direction. The thermal developing section 18 and the optical fixing section 20 are partitioned by a partition wall 78 that has an opening through which the light and heat sensitive recording sheets 12S run. The receiver section 22 has the outlet 22A through which the image-recorded sheets 12S are ejected into the receiving section 22.

In the cassette-type casing section 14, a number of the light and heat sensitive recording sheets 12S are stacked with their recording layers facing upward. The casing section 14 has an outlet 14A, through which the light and heat sensitive recording sheets 12S are one by one guided into an optical recording zone. The pair of carrier rollers 62 is disposed in the optical recording section 16, adjacent to the outlet 14A. Nipping one light and heat sensitive recording sheet 12S therebetween, the pair of carrier rollers 62 rotates, and the one light and heat sensitive recording material 12S loaded in the casing section 14 is drawn out into the optical recording zone. Having been drawn out of the casing section 14, the light and heat sensitive recording sheet 12S is conveyed in the traveling direction, is turned upward by about 90 degrees, and reaches the optical recording section 16 which is disposed downstream in the traveling direction.

The optical recording section 16 has the light beam scanning device 26, an exposure drum 80 and nip rollers 82 and 84, which are disposed to be detachable from the exposure drum 80, disposed along the sheet traveling direction and above the casing section 14. The nip rollers 82 and 84 are positioned upstream and downstream from an exposure site of the light beam scanning device 26 in such a manner as to sandwich the exposure site therebetween. The light beam scanning device 26 is the same as in the first embodiment, and is therefore indicated by the same reference numeral in the two embodiments. Further description thereof is omitted.

One light and heat sensitive recording sheet 12S is held at the exposure site by the nip rollers 82 and 84 and by the exposure drum 80, and is main-scanned by the light beam scanning device 26. While being scanned in this manner, the light and heat sensitive recording material 12S is conveyed along the traveling direction by the nip rollers 82 and 84 and by the exposure drum 80, and is sub-scanned in the direction opposite to the traveling direction. In this manner, the light and heat sensitive recording material 12S is exposed to light on its recording layer, and a latent image is thereby recorded. Preferably, the wavelengths of the light sources for exposure, and the maximum radiation energy on the surface of the light and heat sensitive recording sheet 12S are within the same ranges as in the first embodiment.

The pair of carrier rollers 63 is disposed downstream in the traveling direction from the optical recording section 16. Nipped by the pair of carrier rollers 63, the light and heat sensitive recording sheet 12S is conveyed along the traveling route, and reaches the moisture content-controlling section 17 which is disposed further downstream in the traveling direction.

The moisture content-controlling section 17 has the moisture content sensor 51 that serves as a moisture content-measuring device, and is disposed adjacent to the light and heat sensitive recording sheet 12S, and the plate heater 55 that serves as a moisture content-controlling device, and is disposed along the traveling route. The plate heater 55 is connected with the control section 57, and is switched on and off in accordance with control signals from the control section 57.

In the moisture content-controlling section 17, the moisture content of the recording sheet 12S is detected by the moisture content sensor 51, and the plate heater 55 is switched on or off in accordance with control signals from the control section 57, as in the first embodiment described above. Thus, the moisture content of the light and heat sensitive recording sheet 12S is controlled by the section 17. The preferred range of heating temperature is the same as in the first embodiment.

Further similarly to the first embodiment, the moisture content-controlling section may include the humidifier 59 that serves as a moistening device, in place of the plate heater 55 serving as a heating device. The humidifier 59 may be disposed above the traveling route. If desired, both the heating device and the moistening device may be provided in the moisture content-controlling section.

The pair of carrier rollers 64 is disposed downstream in the traveling direction from the moisture content-controlling section 17. The light and heat sensitive recording material 12S is nipped by the pair of carrier rollers 64 and conveyed along the traveling route, while being turned about 90 degrees toward the left (of the drawing), and reaches the thermal developing section 18 which is disposed further downstream in the traveling direction.

The thermal developing section 18 is equipped with a drum heater 86, which is disposed below the traveling route and serves as a heating device for heating the exposed surface of the light and heat sensitive recording sheet 12S, and a pressure roller 88 disposed opposite the drum heater 86 such that the light and heat sensitive recording sheet 12S passes through a space between the roller 88 and the drum 86. The drum heater 86 has a heat source such as a halogen lamp or the like therein side. The drum heater 86 is controlled by a temperature controller (not shown) so as to heat the light and heat sensitive recording material 12S up to a predetermined temperature on the basis of data from a temperature sensor (not shown) disposed near the light and heat sensitive recording material 12S. In the thermal developing section 18, the light and heat sensitive recording material 12S is heated by the drum heater 86 up to the predetermined temperature, and the recorded latent image is developed. Preferably, the heating temperature is within the same range as in the first embodiment.

The pair of carrier rollers 66 is disposed downstream in the traveling direction from the thermal developing section 18. After having been developed in the thermal developing section 18, the light and heat sensitive recording sheet 12S is nipped by the pair of carrier rollers 66 and conveyed in a leftward direction (of the drawing) along the traveling route, and reaches the optical fixing section 20 which is disposed further downstream in the traveling direction.

The optical fixing section 20 is equipped with the fixing light sources 48A, 48B, 48C and 48D that emit light toward the image-forming surface of the developed light and heat sensitive recording sheet 12S, and with the reflector 49 that is disposed behind the fixing light sources 48A, 48B, 48C and 48D. Here, the fixing light sources 48A, 48B, 48C and 48D are all disposed below the traveling route. In the optical fixing section 20, the developed light and heat sensitive recording sheet 12S is irradiated with light from the fixing light sources 48A, 48B, 48C and 48D, and the developed image is thus fixed on the light and heat sensitive recording sheet 12S. Including light intensity, the details of the fixing sources 48 may be the same as in the first embodiment.

The pairs of carrier rollers 68, 69, 70, 72 and 74 are disposed downstream in the traveling direction from the optical fixing section 20. After optically fixing in the optical fixing section 20, the light and heat sensitive recording material 12S is nipped by the pairs of carrier rollers 68, 69, 70, 72 and 74, turned upward about 90 degrees between the carrier roller pairs 69 and 70, and rightward about 90 degrees between the carrier roller pairs 72 and 74, and conveyed along the traveling route toward the receiver section 22 which is disposed further downstream in the traveling direction.

A print tray 53 is provided adjacent to the outlet 22A of the receiver section 22. After having been continuously processed for exposure, development and fixation as described above, the light and heat sensitive recording sheet 12S is fed out to the print tray 53.

In the second embodiment, all the steps of optical recording, thermal development and optical fixation of light and heat sensitive recording sheets can be carried out in one apparatus. Specifically, in this apparatus, since the latent image formed on each recording sheet is thermally developed and the developed image thereon is optically fixed, no processing solution is needed. Therefore, this apparatus may be a completely dry system, and, because of not requiring an image-receiving member and the like, does not leave waste. In addition, because the casing section, the optical recording section, the thermal developing section and the optical fixing section are vertically arranged in the apparatus, and the sheet traveling route is curved between the sections therein, it is possible to further reduce the size of the apparatus.

In addition, in this apparatus, the exposed light and heat sensitive recording sheet is heated in the moisture content-controlling section so as to evaporate moisture before development, whereby the moisture content is controlled suitably for preventing uneven development. Accordingly, the developed sheet is free from the problem of image mottling that is caused by moisture in thermal development. Further, since the recording sheet is heated on the surface opposite to the exposed surface, moisture can be evaporated away efficiently. Accordingly, the treatment for moisture content control of the recording sheet can be effected within a short period of time.

In the first and second embodiments, a light beam scanning device equipped with laser sources is used in the optical recording section. Rather than this, lamps and LEDs could also be used, with the light therefrom being appropriately focused. The recording material may in certain cases be exposed to light via images projected with a lamp or the like. If desired, contact exposure is employable in the apparatus of the present invention.

In the first and second embodiments, a fixing light source is disposed, separately from the recording light source in the optical recording section. Rather than this, a light beam scanning device equipped with a laser light source and used in the optical recording section could also be used in the optical fixing section, with the developed image being optically fixed by scanning exposure with light from the light beam scanning device, having the same wavelength as the recording light.

In the first embodiment, the heating device used is a far-infrared heater, and in the second embodiment, the heating device used is a drum heater combined with a pressure roller. Besides these, any other of various heating devices, as shown in FIGS. 7 to 15, are also usable in the apparatus of the present invention. These heating devices may also be used as a heating device for the moisture content-controlling section. In the first and second embodiments, the light and heat sensitive recording material is heated from the exposed surface side. Rather than this, the light and heat sensitive recording material could be heated from the support side.

Figure 7:
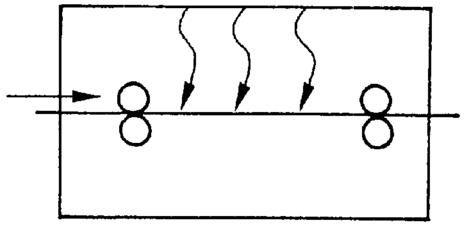
FIG. 7 is a schematic view showing another structural example of a heating device.
Figure 8:
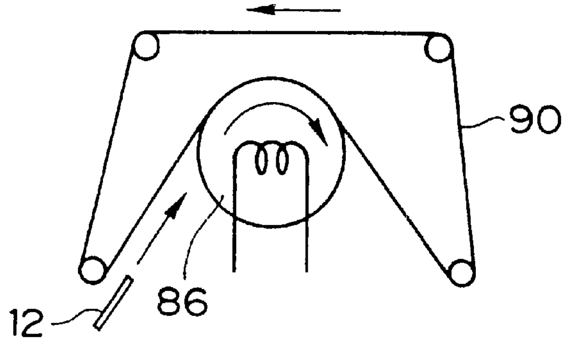
FIG. 8 is a schematic view showing another structural example of a heating device.
Figure 9:
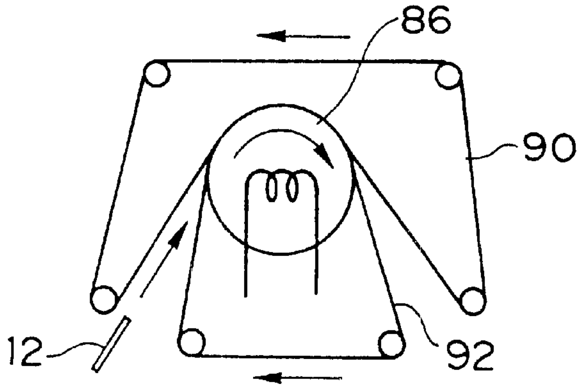
FIG. 9 is a schematic view showing another structural example of a heating device.

The heating device shown in FIG. 7 is for thermal development with hot air streams. In the heating device of FIG. 8, a pressure belt 90, which serves as a pressure member, is used. Here, the pressure belt 90 presses the light and heat sensitive recording material 12 against the drum heater 86 and the latent image formed on the light and heat sensitive recording material 12 is developed by heat. In the heating device shown in FIG. 9, a belt 92 is disposed to run under tension around the drum heater 86, which has a heat source inside, and the light and heat sensitive recording material 12 is pressed against the belt 92 by the pressure belt 90, and heated for thermal development.

Figure 10:
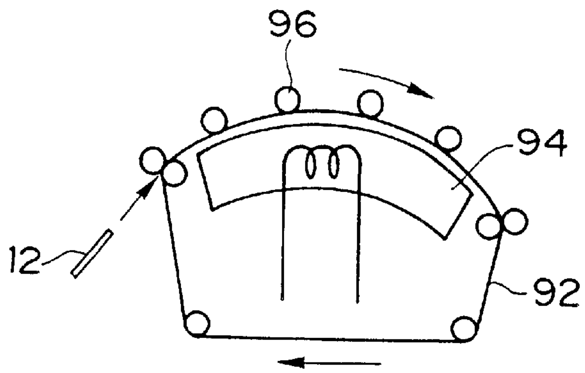
FIG. 10 is a schematic view showing another structural example of a heating device.
Figure 11:
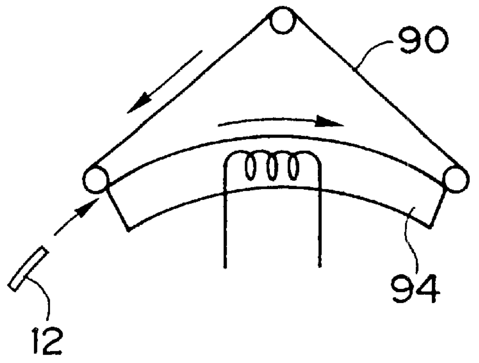
FIG. 11 is a schematic view showing another structural example of a heating device.

In the heating device shown in FIG. 10, the belt 92 is disposed to run under tension around a convex plate heater 94, the light and heat sensitive recording material 12 is pressed by a plurality of pressure rollers 96 against the belt 92, and is heated for thermal development. In the heating device shown in FIG. 11, the pressure belt 90 that serves as a pressure member is used. Here, the pressure belt 90 presses the light and heat sensitive recording material 12 against the convex plate heater 94, and the latent image formed on the light and heat sensitive recording material 12 is developed by heating.

Figure 12:
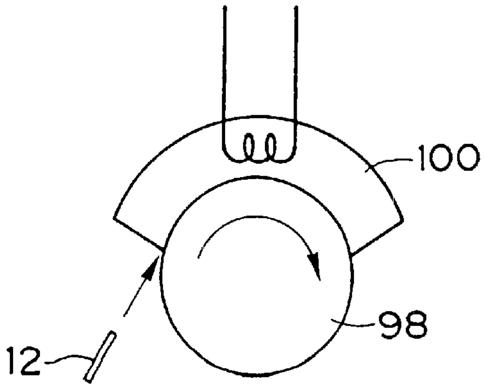
FIG. 12 is a schematic view showing another structural example of a heating device.
Figure 13:
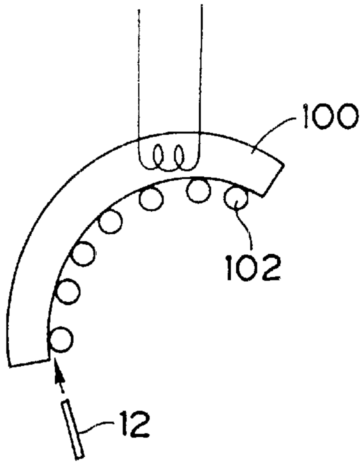
FIG. 13 is a schematic view showing another structural example of a heating device.

In the heating device shown in FIG. 12, a concave plate heater 100 is disposed along the periphery of a drum 98, the drum 98 presses the light and heat sensitive recording material 12 against the concave plate heater 100, and the latent image formed on the light and heat sensitive recording material 12 is developed by heat. In the heating device shown in FIG. 13, a plurality of pressure rollers 102, which all serve as a pressure member, are disposed along the inner periphery of the concave plate heater 100, the light and heat sensitive recording material 12 is pressed against the concave plate heater 100 by the pressure rollers 102, and is heated for thermal development.

Figure 14:
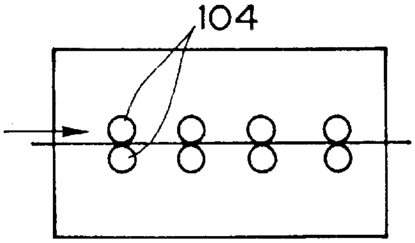
FIG. 14 is a schematic view showing another structural example of a heating device.
Figure 15:
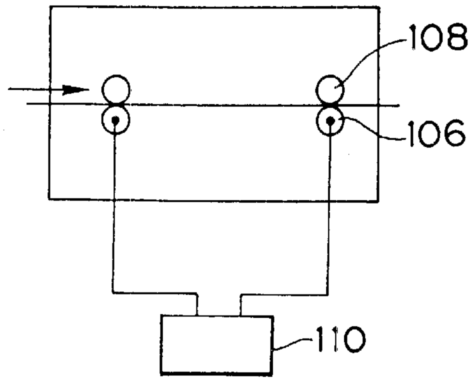
FIG. 15 is a schematic view showing another structural example of a heating device.

In the heating device shown in FIG. 14, a plurality of pairs of heating rollers 104, each and all having a heat source therein side, are disposed along the traveling route, and the light and heat sensitive recording material 12, while being nipped by the heating roller pairs 104, is heated thereby for thermal development. In the heating device shown in FIG. 15, heating rollers 106 are electrically heated by an external power source that is directly connected thereto, and a plurality of roller pairs, each of one of the heating rollers 106 and one of pressure rollers 108, is disposed along the traveling route. Here, the light and heat sensitive recording material 12 is heated by the roller pairs while being nipped thereby, and is thus thermally developed.

Next, a light and heat sensitive recording material, which is used for image recording in the image-recording device of the present invention, will be described. The light and heat sensitive recording material used in the present invention has a photosensitive thermal layer (an image-recording layer) on a support. At this photosensitive thermal layer, a latent image is formed by exposure. The latent image is developed by being heated, so that an image is formed. In the light and heat sensitive recording material used in the present invention, other than the light and heat sensitive recording layer, conventionally known other layers such as a protection layer, an intermediate layer, a UV absorbing layer and the like may be formed at any position. The light and heat sensitive recording material used in the present invention has, on the support, at least three light and heat sensitive recording layers, which include a yellow color-forming component, a magenta color-forming component and a cyan color-forming component, respectively. Thus, the material can be used for color image formation as a color light and heat sensitive recording material. This color light and heat sensitive recording material may include a light and heat sensitive recording layer that includes a black color-forming component, if required.

In the present invention, a light and heat sensitive recording material which includes a light and heat sensitive recording layer (a), (b), (c) or (d) can be appropriately used. These light and heat sensitive recording layers (a), (b), (c) and (d) are as follows.

A photosensitive thermal layer (a) contains 1) thermally-responsive microcapsules which encapsulate a color-forming component A and, outside the microcapsules, 2) a photo-polymerizable composition which contains at least i) a compound B which is substantially colorless and has, within the same molecule, a polymerizable group and a site which reacts with the color-forming component A to form color, and ii) a photoinitiator.

A light and heat sensitive recording layer (a) contains 1) thermally-responsive microcapsules which encapsulate a color-forming component A and, outside the microcapsules, 2) a photo-polymerizable composition which contains at least i) a substantially colorless compound C which reacts with the color-forming component A to form color, ii) a photo-polymerizable compound D and iii) a photoinitiator.

A light and heat sensitive recording layer (c) contains 1) thermally-responsive microcapsules which encapsulate a color-forming component A and, outside the microcapsules, 2) a photo-polymerizable composition which includes at least i) a substantially colorless compound C which reacts with the color-forming component A to form color, ii) a photo-polymerizable compound Dp which has a site that suppresses the reaction of the color-forming component A with the compound C, and iii) a photoinitiator.

A light and heat sensitive recording layer (d) contains 1) thermally-responsive microcapsules which encapsulate a substantially colorless compound C which reacts with a color-forming component A to form color and, outside the microcapsules, 2) a photo-polymerizable composition which contains at least i) the color-forming component A, ii) a photo-polymerizable compound D and iii) a photoinitiator.

In the light and heat sensitive recording layer (a), by carrying out exposure of a desired image shape, the photo-polymerizable composition outside the microcapsules polymerizes and is cured by radicals generated from the photo-initiator so that a latent image of the desired image shape is formed. Then, due to heating, the compound B present in an unexposed portion moves within the recording material, and reacts with the color-forming component A within the capsules, thereby forming color. Accordingly, the above-described light and heat sensitive recording layer (a) is a positive light and heat sensitive recording layer in which colors are not formed at an exposed portion, and uncured portions in the unexposed portion form color so that an image is formed. Specific examples thereof include a light and heat sensitive recording layer disclosed in Japanese Patent Application Laid-Open (JP-A) No. 3-87827, which contains, outside microcapsules, a photo-curable composition that contains a compound having, within the same molecule, an electron accepting group and a polymerizable group and that has a photoinitiator, and which includes an electron donating colorless dye which is encapsulated in the microcapsules. In this light and heat sensitive recording layer, by carrying out exposure, the photo-curable composition present outside the microcapsules polymerizes and is cured so that a latent image is formed. Thereafter, due to heating, the electron accepting compound present in unexposed portions moves within the recording material and reacts with the electron donating colorless dye within the microcapsules so as to form color. Accordingly, the cured latent image portions in the exposed portions do not form color and only the uncured portions form color, so that a sharp positive image having high contrast can be formed.

In the above-described light and heat sensitive recording layer (b), by effecting exposure to the desired image shape, the photo-polymerizable compound D is polymerized by radicals generated from the photoinitiator, which begins a reaction when exposed, and the film is cured so that a latent image of the desired image shape is formed. Because the photo-polymerizable compound D does not have a site for suppressing the reaction of the color-forming component A with the compound C, the compound C present in the unexposed portion moves within the recording material due to heating, and reacts with the color-forming component A within the capsules so as to form color. Thus, the above-described light and heat sensitive recording layer (b) is a positive light and heat sensitive recording layer in which color is not formed at the exposed portions and color is formed at the uncured portions in the unexposed portion, so that an image is formed. Specific examples of such a light and heat sensitive recording layer include a light and heat sensitive recording layer which contains an azomethine dye precursor encapsulated in microcapsules, a deprotective agent which generates an azomethine dye from the dye precursor, a photo-polymerizable compound and a photo-initiator. In this light and heat sensitive recording layer, by effecting exposure, the photo-polymerizable compound outside the microcapsules is polymerized and cured, and a latent image is formed. Then, the deprotective agent present in the unexposed portion is moved within the recording material by heating, and reacts with the azomethine dye precursor within the microcapsules so as to form color. Accordingly, the cured latent image portion of the exposed portion does not form color and only the uncured portions form color, so that a positive image can be formed.

In the light and heat sensitive recording layer (c), by carrying out exposure to the desired image shape, the photo-polymerizable compound Dp is polymerized by radicals generated from the photoinitiator, which begins a reaction when exposed, and the film is cured so that a latent image of the desired image shape is formed. Since the photo-polymerizable compound Dp has a site for suppressing the reaction of the color-forming component A with the compound C, the compound C moves depending on the film characteristic of the latent image (the cured portion) formed by exposure, and reacts with the color-forming component A in the capsules to form the image. Thus, the above-described light and heat sensitive recording layer (c) is a negative light and heat sensitive recording layer, in which the exposed portion forms color so that an image is formed. Specific examples of such a light and heat sensitive recording layer include a light and heat sensitive recording layer disclosed in JP-A No. 4-211252 which contains, outside microcapsules, an electron accepting compound, a polymerizable vinyl monomer and a photoinitiator and, encapsulated in the microcapsules, an electron donating colorless dye. The mechanism for image formation in this light and heat sensitive recording layer is unclear but is thought to be as follows. The vinyl monomer which exists outside the microcapsules is polymerized by exposure. Meanwhile, the electron accepting compound present at the exposed portion is not included in the formed polymer at all. Instead, the interaction of the electron accepting compound with the vinyl monomer decreases, so that the electron accepting compound exists in a movable state with high diffusion speed. The electron accepting compound in the unexposed portion is trapped by the vinyl monomer in the unexposed portion. Thus, under heating, the electron accepting compound in the exposed portion moves preferentially within the recording material, and reacts with the electron donating colorless dye within the microcapsules. The electron accepting compound in the unexposed portion cannot penetrate the capsule walls, even when heated, and does not react with the electron donating colorless dye, so cannot contribute to color formation. Accordingly, in the light and heat sensitive recording layer, since the image is formed such that the exposed portion thereof forms color and the unexposed portion thereof does not form color, a sharp negative image with high contrast can be formed.

In the above-described light and heat sensitive recording layer (d), by carrying out exposure to the desired image shape, the photo-polymerizable compound D is polymerized by radicals generated from the photoinitiator, which begins reaction due to exposure, and the film is cured, so that a latent image of the desired image shape is formed. Since the photo-polymerizable compound D does not have a site for suppressing the reaction of the color-forming component A with the compound C, the color-forming component A present at the unexposed portion moves within the recording material when heated, and reacts with the compound C within the capsules so as to form color. Accordingly, the above-described light and heat sensitive recording layer (d) is a positive light and heat sensitive recording layer in which color is not formed at the exposed portion and color is formed at the uncured portions of the unexposed portion, so that an image is formed.

Components which form the above-described light and heat sensitive recording layers (a) through (d) will be described in detail hereinafter. As the color-forming component A in the light and heat sensitive recording layers (a) through (d), a substantially colorless electron donating colorless dye or a diazonium salt compound may be used.

Conventionally known electron donating colorless dyes may be used, and any dye may be used provided it reacts with the compound B or the compound C to form color. Specific examples of these color-forming components include the compounds disclosed in Japanese Patent Application No. 11-36308. Examples of the electron donating compound are disclosed from paragraph [0051] to paragraph [0059] in Japanese Patent Application No. 11-36308. Electron donating colorless dyes for cyan, magenta and yellow color-forming dyes which can be used in combination with the electron donating compound when the light and heat sensitive recording material is used as a full color recording material in the present invention are disclosed in paragraph [0060] of Japanese Patent Application No. 11-36308. The above-described electron donating colorless dye is preferably used in the range of 0.1 to 1 $g/m^2$ and more preferably in the range of 0.1 to 0.5 $g/m^2$. If the amount of the electron donating colorless dye to be used is less than 0.1 $g/m^2$, there may be a case in which color density cannot be sufficiently obtained. If the amount exceeds 1 $g/m^2$, a coating characteristic may deteriorate, which is not preferable.

Examples of the diazonium salt compound include compounds represented by the following formula, $$Ar_1—N_2+X^-$$

which $Ar_1$ represents an aromatic ring and X-represents an acid anion.

The diazonium salt compound is a compound that causes a coupling reaction with the coupler when heated, so as to form color, and which is decomposed by light. The wavelength of maximum absorption of the diazonium salt compound can be controlled by varying positions and kinds of substituents at the $Ar_1$ portion thereof. In the present invention, the wavelength of maximum absorption $\lambda$ max of the diazonium salt compound is preferably 450 nm or less, and more preferably 290 to 440 nm, in view of the effects of the present invention. Further, in the present invention, the diazonium salt compound preferably has at least 12 carbon atoms, solubility in water of 1% or less, and solubility in ethyl acetate of 5% or more. Specific examples of the diazonium salt compound which can be appropriately used include, but are not limited to, the compounds disclosed from paragraph [0064] to paragraph [0075] in Japanese Patent Application No. 11-36308.

The diazonium salt compound may be used alone or in a combination of two or more kinds, in accordance with purposes such as hue adjustment and the like. The amount of the diazonium salt compound used in the light and heat sensitive recording layer is preferably 0.01 to 3 $g/m^2$ and more preferably 0.02 to 1.0 $g/m^2$. If the amount of the diazonium salt compound is less than 0.01 $g/m^2$, sufficient color-forming ability cannot be obtained. An amount exceeding 3 $g/m^2$ is not preferable because sensitivity may decrease and a long fixing time may be required.

The substantially colorless compound B, which is used in the photosensitive thermal transfer layer (a) and has, within the same molecule, a polymerizable group and a site which reacts with the color-forming component A to form color, may be any compounds that reacts with the color-forming component A to form color, such as an electron accepting compound having a polymerizable group or a coupler compound having a polymerizable group or the like, and that reacts under light to be polymerized and cured.

The electron accepting compound having a polymerizable group, i.e., a compound having an electron accepting group and a polymerizable group in the same molecule, may be any compound that has a polymerizable group, reacts with the electron donating colorless dye, which is one form of the color-forming component A, to form color, and is able to cure the film by photopolymerization.

Examples of the electron accepting compound having a polymerizable group are compounds which are able to be synthesized with reference to the following compounds:

3-halo-4-hydroxybenzoic acid, disclosed in JP-A No. 4-226455;

methacryloxyethylesters and acryloxyethylesters of benzoic acid having a hydroxy group, disclosed in JP-A No. 63-173682; esters of benzoic acid having a hydroxy group and hydroxymethylstyrene, disclosed in JP-A Nos. 59-83693, 60-141587 and 62-99190; hydroxystyrenes, disclosed in European Patent No. 29323; N-vinyl imidazole complexes of zinc halide, disclosed in JP-A Nos. 62-167077 and 62-167078; an electron accepting compound disclosed in JP-A No. 63-317558; and the like.

Among these compounds having an electron accepting group which reacts with the electron donating colorless dye and a polymerizable group in the same molecule, 3-halo-4-hydroxybenzoic acids represented by the following general formula, which are electron accepting compounds having a polymerizable group are preferable:

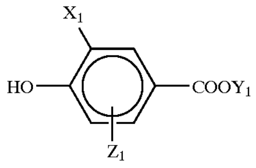

in which $X_1$ represents a halogen atom, preferably a chlorine atom. $Y_1$ represents a monovalent group having a polymerizable ethylene group. An aralkyl group having a vinyl group, an acryloyloxyalkyl group having a vinyl group, or a methacryloylalkyl group having a vinyl group is preferable. An acryloyloxyalkyl group having 5 to 11 carbon atoms or a methacryloyloxyalkyl group having 6 to 12 carbon atoms is more preferable. $Z_1$ represents a hydrogen atom, an alkyl group or an alkoxy group.

Specific examples of the electron accepting compound having a polymerizable group include compounds disclosed from paragraph [0082] to paragraph [0087] in Japanese Patent Application No. 11-36308.

The electron accepting compound having a polymerizable group is used in combination with the electron donating colorless dye. In this case, the electron accepting compound is used in the range of 0.5 to 20 parts by weight, and more preferably in the range of 3 to 10 parts by weight, per one part by weight of the electron donating colorless dye to be used. If the amount of the electron accepting compound is less than 0.5 parts by weight, sufficient color-forming density cannot be obtained. An amount of the electron accepting compound exceeding 20 parts by weight is not preferable because sensitivity may decrease and the coating characteristic may deteriorate.

If the electron donating colorless dye and the electron accepting compound are used as color-forming components, in order to obtain a predetermined maximum coloring density, a method of selecting the kinds of the electron donating colorless dye and the electron accepting compound or a method of adjusting a coating amount of the formed recording layer may be utilized.

The coupler compound having a polymerizable group used in the photosensitive thermal transfer layer (a) may be any compound that has a polymerizable compound, reacts with the diazonium salt compound, which is one form of the color-forming component A, to form color, and can cure the film by photopolymerization. The coupler compound is coupled to a diazo compound under a basic atmosphere and/or a neutral atmosphere to form a dye. A plurality of kinds of coupler compound may be used in accordance with various purposes such as hue adjustment and the like. Specific examples of the coupler compound include, but are not limited to, compounds disclosed from paragraph [0090] to paragraph [0096] in Japanese Patent Application No. 11-36308. The coupler compound may be added to the light and heat sensitive recording layer (a) in the range of 0.02 to 5 $g/m^2$ and more preferably in the range of 0.1 to 4 $g/m^2$ in view of effects. An added amount of less than 0.02 $g/m^2$ is not preferable because the color-forming ability deteriorates, and an added amount exceeding 5 $g/m^2$ is not preferable because the coating characteristic deteriorates.

The coupler compound is used in combination with the diazonium salt compound. In this case, the coupler compound is preferably used in the range of 0.5 to 20 parts by weight and more preferably in the range of 1 to 10 parts by weight per one part by weight of the diazonium salt compound. If the amount of the coupler compound is less than 0.5 parts by weight, sufficient color-forming ability cannot be obtained. An amount of the coupler compound exceeding 20 parts by weight is not preferable because the coating characteristic deteriorates. The coupler compound may be employed by adding a water-soluble polymer together with other components and solid-dispersing with a sand mill or the like. Also, the coupler compound may be used as an emulsion by being emulsified together with an appropriate emulsion aid. Here, the method of solid-dispersing or emulsifying-is not especially limited and conventional known methods may be used. Details of such methods are disclosed in JP-A Nos. 59-190886, 2141279 and 7-17145.

In the light and heat sensitive recording layer (a), in order to accelerate the coupling reaction, organic bases such as tertiary amines, piperidines, piperazines, amidines, formamidines, pyridines, guanidines, morpholines and the like are preferably used. Specifically, these organic bases are disclosed in JP-A Nos. 57-123086, 60-49991, 60-94381, 9-71048, 9-77729, and 9-77737 and the like. The amount of the organic base used is not especially limited, but is preferably 1 to 30 mol per one mol of the diazonium salt compound.

Moreover, in order to accelerate the color-forming reaction, a color-forming aid may be added to the light and heat sensitive recording layer (a). Examples of the color-forming aid include phenol derivatives, naphthol derivatives, alkoxy-substituted benzenes, alkoxy-substituted naphthalenes, hydroxy compounds, amide carboxylate compounds, sulfonamide compounds and the like. These compounds have functions of decreasing the melting point of the coupler compound or the basic substance, or of enhancing the thermal-permeability of the microcapsule wall, and thus are considered to be compounds by which high color-forming density can be obtained.

In the light and heat sensitive recording layers (b) through (d), as the compound which reacts with the color-forming component A to form color, instead of the compound B, which has a polymerizable group, the substantially colorless compound C, which does not have a polymerizable group and which reacts with the color-forming component A to form color, may be used. Here, as the compound C does not have a polymerizable group, in order to have the recording layer cure by photopolymerization, the photo-polymerizable compound D having a polymerizable group is used.

As the compound C, any electron accepting compound or coupler compound which does not have a polymerizable group may be used. Any electron accepting compound which does not have a polymerizable group may be used that can react with the electron donating colorless dye, which is one form of the color-forming component A, to form color.

Examples of the electron accepting compound which does not have a polymerizable group include phenol derivatives, salycylic acid derivatives, metal salts of aromatic carboxylic acid, acid clay, bentonite, novolak resin, metal-treated novolak resin, metal complexes, and the like. Specific examples of the electron accepting compound which does not have a polymerizable group are disclosed in Japanese Patent Application Publication (JP-B) Nos. 40-9309 and 45-14039, JP-A Nos. 52-140483, 4851510, 57-210886, 58-87089, 59-11286, 60-176795 and 61-95988, and the like. Other specific examples of the electron accepting compound which does not have a polymerizable group are disclosed from paragraph [0109] to paragraph [0110] in Japanese Patent Application No. 11-36308 and the like. The amount of the electron accepting compound which does not have a polymerizable group to be used is preferably 5 to 1,000% by weight based on the amount of the electron donating colorless dye to be used.

Any coupler compound which does not have a polymerizable group may be used that reacts with the diazonium salt compound, which is one type of the color-forming component A, so as to form color. The coupler compound which does not have a polymerizable group is a compound which couples to the diazonium salt compound under a basic atmosphere and/or a neutral atmosphere to form a dye. A plurality of kinds of coupler compound can be used in combination, in accordance with various purposes such as hue adjustment and the like. Examples of the coupler compound which does not have a polymerizable group include so-called active methylene compounds, which have a methylene group adjacent to a carbonyl group, phenol derivatives, naphthol derivatives and the like, and can be appropriately selected and used.

Specific examples of the coupler compound which does not have a polymerizable group include compounds disclosed from paragraph [0119] to paragraph [0121] in Japanese Patent Application No. 11-36308. Coupler compounds which do not have a polymerizable group are disclosed in JP-A Nos. 4-201483, 7-223367, 7-223368, 7-323660, 5-278608, 5-297024, 6-18669, 6-18670 and 7-316280, and the like. Reference can also be made to Japanese Patent Application Nos. 8-12610 and 8-30799, JP-A Nos. 9-216468, 9216469, 9-319025, 10-35113, 10-19380 and 10-264532, which have been previously filed by the present applicant.

The coupler compound which does not have a polymerizable group is added to the light and heat sensitive recording layer (b), as in the case of the coupler compound which has a polymerizable group, in the range of 0.02 to 5 $g/m^2$ and more preferably in the range of 0.1 to 4 $g/m^2$ in view of effects. If the added amount is less than 0.02 $g/m^2$, sufficient color-forming density cannot be obtained. An added amount exceeding 5 $g/m^2$ is not preferable because the coating characteristic deteriorates. The coupler compound may be employed by adding a water-soluble polymer together with other components and solid-dispersing with a sand mill or the like. Also, the coupler compound may be used in an emulsion by being emulsified together with an appropriate emulsion aid. The method of solid-dispersing or emulsifying is not especially limited and conventional known methods may be used. Details of such methods are disclosed in JP-A Nos. 59-190886, 2141279 and 7-17145.

In order to accelerate the coupling reaction in the light and heat sensitive recording layers (b) through (d), organic bases such as tertiary amines, piperidines, piperazines, amidines, formamidines, pyridines, guanidines, morpholines and the like are preferably used. The organic bases used here are the same bases as those used in the case of the coupler compound having a polymerizable group. The amount of the organic base to be used is also the same. With regard to color-forming aids, which are used in order to accelerate the color-forming reaction, the same ones as those in the case of the coupler compound having a polymerizable group can be used.

As the photo-polymerizable compound D, a photo-polymerizable monomer can be used. A photo-polymerizable monomer which has at least one vinyl group within a molecule may be used. In order to obtain a negative image, the photo-polymerizable compound Dp, which has a site for suppressing the reaction of the color-forming component A with the compound C, may be used as the photo-polymerizable compound. An appropriate photo-polymerizable compound Dp, i.e., a specific photo-polymerizable monomer (Dp1 or Dp2), is selected and used in accordance with the compound C to be used.

If the electron accepting compound which does not have a polymerizable group is used, the specific photo-polymerizable monomer Dp1 is used. The photo-polymerizable monomer Dp1 is preferably a photo-polymerizable monomer which has a reaction-inhibiting function for inhibiting the reaction between the electron donating colorless dye and the electron accepting compound and has at least one vinyl group within the molecule thereof.

Specific examples of the photo-polymerizable monomer include acrylic acid and salts thereof, acrylates, acrylamides; methacrylic acid and salts thereof, methacrylates, methacrylamides; anhydrous maleic acid, maleates; itaconic acid, itaconates; styrenes; vinyl ethers; vinyl esters; N-vinyl heterocyclic rings; arylethers; allylesters and the like. Among the aforementioned monomers, in particular, a photo-polymerizable monomer having a plurality of vinyl groups within the molecule is preferably used. Examples of such a photo-polymerizable monomer include acrylic esters and methacrylic esters of polyhydric alcohols such as trimethylolpropane and pentaerythritol and the like; acrylic esters and methacrylic esters of polyhydric phenols and bisphenols such as resorcinol, pyrogallol, phloroglucinol and the like; and acrylate-terminated or methacrylate-terminated epoxy resins, acrylate-terminated or methacrylate-terminated polyesters and the like. Among the aforementioned monomers, ethylene glycol diacrylate, ethylene glycol dimethacrylate, trimethylolpropane triacrylate, pentaerythritol tetraacrylate, dipentaerythritol hydroxypentaacrylate, hexanediol-1,6-dimethacrylate and diethylene glycol dimethacrylate and the like are especially preferable.

The molecular weight of the photo-polymerizable monomer Dp1 is preferably about 100 to about 5,000 and more preferably about 300 to about 2,000. The photo-polymerizable monomer Dp1 is used preferably in the range of 0.1 to 10 parts by weight and more preferably in the range of 0.5 to 5 parts by weight per one part of the substantially colorless compound C which reacts with the color-forming component A to form color. If the amount of the monomer is less than 0.1 parts by weight, a latent image cannot be formed in the exposure process, and an amount of the monomer exceeding 10 parts by weight is not preferable because the color-forming density will decrease.

When the coupler compound which does not have a polymerizable group is used, the specific photo-polymerizable monomer Dp2 is used in combination therewith. The photo-polymerizable monomer Dp2 is preferably a photo-polymerizable monomer which has an acid group that has an inhibitory effect on the coupling reaction, and which is not a metallic salt compound. Examples of the photo-polymerizable monomer Dp2 include monomers disclosed from paragraph [0128] to paragraph [0130] in Japanese Patent Application No. 11-36308. The photo-polymerizable monomer Dp2 is used preferably in the range of 0.1 to 10 parts by weight and more preferably in the range of 0.5 to 5 parts by weights per one part by weight of the substantially colorless compound C which reacts with the color-forming component A to form color. If the amount of the monomer Dp2 is less than 0.1 parts by weight, a latent image cannot be formed in the exposure process and an amount of the monomer exceeding 10 parts by weight is not preferable because the color-forming density will decrease.

In the light and heat sensitive recording layers (b) through (d), an azomethine dye precursor may be used as the color-forming component A, and, as the compound C, a deprotective agent which generates an azomethine dye (thereby forming color) by contact with the azomethine dye precursor may be used. By using, as the photo-polymerizable compound, the photo-polymerizable compound (Dp) which has a site for suppressing the reaction of the azomethine dye precursor with the deprotective agent, a negative image can be obtained.

As the azomethine dye precursor, a compound represented by the following general formula (1) may be used:

General formula (1)

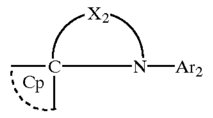

in which $Ar_2$ represents an aromatic ring group or a heterocyclic ring group which may have a substituent, and $X_2$ represents a bivalent connecting group. Cp represents a coupler residue which may form a ring.

Examples of the aromatic ring group, which may have a substituent, represented by $Ar_2$ include groups represented by the following structural formula (3), Structural formula (3)

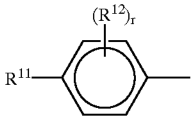

r = 0 to 4 in which $R^{11}$ represents a hydrogen atom, an alkyl group, an aryl group, a halogen atom, a cyano group, a nitro group, $SO_3H$, a heterocyclic ring group, $NR^{13}R^{14}$, $OR^{15}$, $CO_2H$, $SR^{15}$, $COR^{16}$, $CO_2R^{16}$, $SO_2R^{16}$, $SOR^{16}$, $CONR^{17}R^{18}$, $SO_2NR^{17}R^{18}$. $R^{12}$ represents the same groups as $R^{11}$. $R^{11}$ and $R^{12}$ may bind to form a ring. If $R^{11}$ or $R^{12}$ represents a group having a dissociating proton, a salt may be formed. $R^{13}$ and $R^{14}$ represent a hydrogen atom, an alkyl group, an aryl group or a heterocyclic ring group. $R^{15}$ represents a hydrogen atom, $COR^{16}$, $CO_2R^{16}$, $SO_2R^{16}$, $CONR^{17}R^{18}$, an alkyl group or an aryl group. $R^{16}$ represents a hydrogen atom, an alkyl group, an aryl group or a heterocyclic ring group. $R^{17}$ and $R^{18}$ represent a hydrogen atom, an alkyl group, an aryl group or a heterocyclic ring group. r represents an integer of 0 to 4.

Examples of the heterocyclic ring group which may have substituents and which is represented by $Ar_2$ in general formula (1) include pyridine, pyrimidine, triazine, pyridazine, pyrazine, furan, thiophene, pyrrole, pyrazole, triazole, isoxyazole, isothiazole, imidazole, oxazole, thiazole and tetrazole. Examples of the substituents include the groups mentioned for $R^{11}$ and $R^{12}$.

In general formula (1), alkyl groups, aryl groups and heterocyclic ring groups represented by $R^{11}$ to $R^{18}$ may have further substituents. Examples of such substituents include an alkyl group, an aryl group, a hydroxy group, a nitro group, a cyano group, a halogen group, an alkylsulfonyl group, an arylsulfonyl group, an alkoxycarbonyl group, an aryloxycarbonyl group, an acyl group, an amino group, an alkylamino group, a dialkylamino group, an acylamino group, an alkylsulfonylamino group, an arylsulfonylamino group, a carbamoyl group, a sulfamoyl group, an alkylthio group, an arylthio group, a heterocyclic ring group, an arylamino group, a diarylamino group, an arylalkylamino group, an alkoxy group, and an aryloxy group. $Ar_2$ may bind to an aromatic ring or a heterocyclic ring. An alkyl group contained in $Ar_2$ may be a saturated, unsaturated or cyclic group.

Cp in general formula (1) represents a coupler residue. Any conventional known couplers used for silver photography or a diazo heat-sensitive recording materials may be used. Examples of the coupler are described in Research Disclosure No. 17643, VII-C to G and No. 307105, VII-C to G. The coupler is desirably a coupler having non-diffusivity and a hydrophobic group, referred to as a ballast group, or a coupler which does not have the hydrophobic group or a coupler which is polymerized. Examples of a cyan coupler include naphthol couplers, phenol couplers and the like, and are disclosed in U.S. Pat. Nos. 2,369,929, 2,772,162, 2,801,171, 2,895,826, 3,446,622, 3,758,308, 3,772,002, 4,052,212, 4,126,396, 4,146,396, 4,228,233, 4,254,212, 4,296,199, 4,296,200, 4,327,173, 4,333,999, 4,334,011, 4,343,011, 4,427,767, 4,451,559, 4,690,889 and 4,775,616, West German Patent Laid-Open No. 3,329,729, European Patent Nos. 121,365A and 249,453A, JP-A No. 61-42658 and the like. Examples of a magenta coupler include imidazole [1,2-b] pyrazoles disclosed in U.S. Pat. No. 4,500,630, pyrazolone [1,5-b][1,2,4] triazoles disclosed in U.S. Pat. No. 4,540,654 and the like.

Other examples of the magenta coupler include a pyrazolotriazole coupler in which a branched alkyl group is bonded to the 2, 3 or 6 position of a pyrazolotriazole ring, disclosed in JP-A No. 61-65245; a pyrazoloazole coupler whose molecule includes a sulfonamide group, disclosed in JP-A No. 61-65246; a pyrazoloazole coupler which has an alkoxyphenylsulfonamide ballast group, disclosed in JP-A No. 61-147254; a pyrazolotriazole coupler which has an alkoxy group or an aryloxy group at the 6 position thereof, disclosed in European Patent (Laid-Open) Nos. 226,849 and 294,785. Further examples of the coupler include couplers disclosed in U.S. Pat. Nos. 3,061,432, 3,725,067, 4,310,619, 4,351,897 and 4,556,630, European Patent No. 73,636, JP-A Nos. 55-118034, 60-35730, 60-43659, 60-185951 and 6172238, International Application No. WO88/04795, Research Disclosure Nos. 24220 and 24230, and the like. Examples of a yellow coupler are disclosed in U.S. Pat. Nos. 3,933,501, 3,973,968, 4,022,620, 4,248,961, 4,314,023, 4,326,024, 4,401,752, 4,511,649, European Patent No. 249,473A, JP-B No. 58-10739, UK Pat. Nos. 1,425,020 and 1,476,760, and the like. Typical examples of a polymerized dye-forming coupler are disclosed in U.S. Pat. Nos. 3,451,820, 4,080,211, 4,367,282, 4,409,320 and 4,576,910, European Patent No. 341,188A, UK Patent No. 2,102,137 and the like. Other examples of such a polymerized dye-forming coupler are disclosed in Japanese Patent Application Nos. 9-260336 and 9-271395 and the like.

The bivalent connecting group represented by $X_2$ in general formula (1) is preferably a bivalent group represented by the following structural formula, $$—Q^1—(Q^2)_l—(Q^3)_m—(Q^4)_n—Q^5—$$

in which $Q^1$, $Q^2$, $Q^3$, $Q^4$ and $Q^5$ represent a connecting group for forming $X_2$, and m and n represent an integer of 0 or 1. Examples of $Q^1$, $Q^2$, $Q^3$, $Q^4$ and $Q^5$ include the following groups. $Q^1$ is positioned at a side at which a carbon atom is bonded and $Q^5$ is positioned at a side at which a nitrogen atom is bonded.

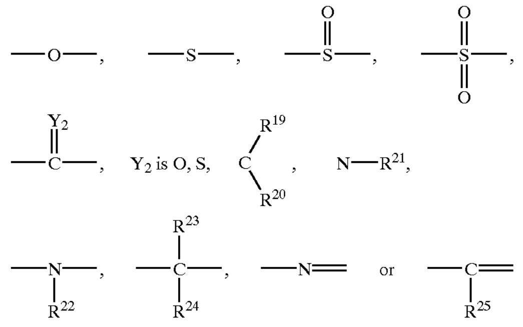

In the formulae $R^{19}$, $R^{20}$ and $R^{21}$ represent substituents. The substituents are the same as those represented by $R^{11}$. $R^{19}$, $R^{20}$ and $R^{21}$ may form a ring with other atoms in $X_2$. $R^{22}$ represents a substituent, the same as those represented by $R^{11}$. $R^{22}$ may form a ring with other atoms in $X_2$. $R^{23}$ and $R^{24}$ represent substituents, the same as those represented by $R^{11}$. $R^{23}$ and $R^{24}$ may form a ring with other atoms in $X_2$. $R^{25}$ represents a substituent, and examples of the substituent are the same as those represented by $R^{11}$. $R^{25}$ may form a ring with other atoms in $X_2$.

In the above structural formula, $Q^1$, $Q^2$, $Q^3$, $Q^4$ and $Q^5$ may form independently an aryl group or a heterocyclic ring group (i.e., an allylene group or a bivalent heterocyclic ring group). Examples of the aryl group include a phenyl group, a chlorophenyl group, a methoxyphenyl group, a naphthyl group and the like. Examples of the heterocyclic ring group include pyrazole, imidazole, triazole, tetrazole, pyridine, pyrimidine, triadine, pyridazine, pyrazine, furan, thiophene, pyrrole, isoxazole, isothiazole, oxazole, thiazole and the like. The aryl group or the bivalent heterocyclic ring group may have bonding hands at any positions thereof. The aryl group or the heterocyclic ring group may have a substituent and examples of such a substituent include an alkyl group, an aryl group, a hydroxy group, a nitro group, a cyano group, a halogen group, an alkylsulfonyl group, an arylsulfonyl group, an alkoxycarbonyl group, an aryloxycarbonyl group, an acyl group, an amino group, an alkylamino group, a dialkylamino group, an acylamino group, an alkylsulfonylamino group, arylsulfonylamino group, a carbamoyl group, a sulfamoyl group, an alkylthio group, an arylthio group, a heterocyclic ring group, an alkoxy group and an aryloxy group. The aryl group may bond to a heterocyclic ring, and the heterocyclic ring group may bond to an aromatic ring. The aryl group or the heterocyclic ring group may be bonded at any positions of the ring.

The heterocyclic ring groups in $Q^1$, $Q^2$, $Q^3$, $Q^4$ and $Q^5$ may form, as shown in the following formulae, a sulfonium salt, an oxonium salt or a quaternary salt.

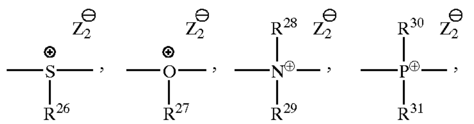

in which $R^{26}$ through $R^{31}$ represent an alkyl group or an aryl group, and examples of the alkyl group and the aryl group are the same as those represented by $R^{13}$ and $R^{14}$. $Z_2$ represents an anion. The anion may be an inorganic anion or an organic anion. Examples of the inorganic anion include a hexafluorophosphic acid ion, borofluoric hydroacid ion, chloride ion, bromide ion, hydrogensulfate ion and the like. Examples of the organic anion include a polyfluoroalkylsulfonic acid ion, polyfluoroalkylcarbonic acid ion, tetraphenylboric acid ion, aromatic carbonic acid ion, aromatic sulfonic acid ion and the like.

In general formula (1), a ring formed by $X_2$, a nitrogen atom and a carbon atom is preferably a five, six or seven member ring and more preferably a six member ring or a seven member ring. $Ar_2$ preferably has the following structure.

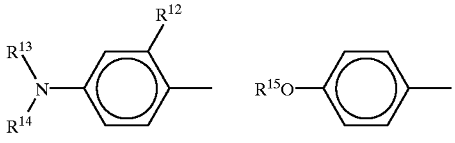

Cp preferably represents acylacetonitrides, pyrazolotriazoles, pyrazolones, pyridones, barbituric acids, pyrorotriazoles, naphtholes, phenols or imidazoles. $Q^1$ in $X_2$ represents —O—, —S—, —N($R^{22}$)—, —N═ or a bivalent heterocyclic ring, and $Q^5$ preferably represents —C(═O)— or —$SO_2$—. Further, combinations thereof are especially preferable.

Examples of the azomethine dye precursor represented by general formula (1) are described from paragraph [0052] to [0070] in Japanese Patent Application No. 2000-18425.

The deprotective agent is at least one kind selected from an acid, a base, an oxidizer, an alkylating agent and a metallic salt. Broadly, compounds having an active hydrogen may be used as the acid. The acid described herein refers to acids in a broad sense and includes, in addition to acids in a narrow sense, Lewis acids. Examples of the acid include organic acids including aliphatic carbonic acid, aromatic carbonic acid, sulfonic acids, phenols, naphthols, carbonamides, sulfonamides, ureas, thioureas, active methylene compounds. Examples of the base include organic bases including primary amines, secondary amines, tertiary amines, piperidines, piperazines, amidines, formamidines, pyridines, guanidines, morpholines and the like. A base precursor which generates the base may be used as the base. Here, the base refers to bases in a broad sense and includes, in addition to bases in a narrow sense, nucleophilic agents (Lewis bases). The base precursor is a compound which liberates a base when heated and examples of the base precursor include salts of bases and organic acids, and the like. Examples of the base which the base precursor forms preferably include those mentioned as bases. An ordinary Bronsted acid or Lewis acid may be used as the organic acid. A carbonic acid which releases a base by a decarboxylation reaction may also be used. Sulfonyl acetic acid and propiolic acid are preferable because the decarboxylation reaction occurs easily therewith. It is preferable if the sulfonyl acetic acid or the propiolic acid has an aromatic substituent (an aryl group or an unsaturated heterocyclic ring group), because then the decarboxylation reaction further accelerates. A base precursor of sulfonyl acetic acid salt is disclosed in JP-A No. 59-168441, and a base precursor of propiolic acetic acid is specifically disclosed in JP-A No. 59-180537.

Examples of the oxidizer include quinones, including 2,3-dichloro-5,6-dicyano-1,4-benzoquinone and tetrachloro-1,4-benzoquinone; nitro compounds, including nitrobenzene and m-nitrobenzenesulfonic acid; nitroso compounds, including nitrosobenzene; cations, including triphenylcations; azo compounds, including diethyl azodicarbonate; nitroxides, including diphenylnitroxide, porphyroxide, 2,2,6,6-tetramethylpiperidine-1-oxyl; N-oxides including pyridine-N-oxide; peracids including sodium perchlorate, potassium periodate, m-chloroperbenzoic acid; halogens including bromine and iodine; hypochlorites including sodium hypochlorite; metallic oxides including manganese dioxide. The oxidizer may be used alone or in a combination of two or more kinds. Examples of the alkylating agent include alkyl halides such as alkyl iodide, alkyl bromide, alkylsulfuric acid, sulfonates and the like. These alkyl groups may further have substituents, and examples of the substituents include an alkoxycarbonyl group, an aryloxycarbonyl group, a carbamoyl group, a sulfonyl group, a sulfamoyl group, and an acyl group. Examples of the metallic salt include metallic salts of compounds including, besides aliphatic carbonic acid and aromatic carbonic acid, which are mentioned as the acid, a mercapto group, a thione group and an imino group. Examples of the metallic atom include monovalent metals such as sodium, potassium, lithium, silver and the like; and multivalent metals such as zinc, magnesium, barium, calcium, aluminum, tin, titanium, nickel, cobalt, manganese, iron and the like. Especially, silver, zinc, aluminum, magnesium and calcium are preferable.

The content (mol) of the deprotective agent is 0.1 to 100 times, more preferably 0.5 to 30 times, as much as the content (mol) of the azomethine dye precursor.

In the light and heat sensitive recording layer (a), the azomethine dye precursor may be used as the color-forming component A, and the deprotective agent having a polymerizable group may be used as the compound B. A deprotective agent having a polymerizable group, such as an ethylene group or the like, within a molecule is preferable as the deprotective agent having a polymerizable group. Examples of the deprotective agent having a polymerizable group include a compound in which a polymerizable ethylene group, a (meth) acrylic group or a (meth) acrylamide group or the like is directly substituted with or substituted via a connecting group by the above-mentioned deprotective agent. Examples of such a deprotective agent are described in paragraphs [0234] to [0238] of Japanese Patent Application No. 2000-18425.

Examples of other combinations of color-forming component A and the compound B or C which reacts with the color-forming component A to form color include the following combinations (A) through (O). In each combination, the color-forming component A and then the compound B or C are mentioned, in that order.

(A) A combination of an organic acid metal salt, such as silver behenate, silver stearate or the like, and a reducer, such as protocatechinic acid, spiroindane, hydroquinone or the like.

(B) A combination of an iron salt of a long-chained fatty acid, such as iron (III) stearate, iron (III) myristinate or the like, and a phenol, such as tannic acid, gallic acid, ammonium salicylate or the like;

(C) A combination of a heavy metal salt of an organic acid, such as a nickel, cobalt, zinc, copper, iron, mercury or silver salt of acetic acid, stearic acid, palmitic acid or the like, and an alkali metal or alkaline earth metal sulfide, such as calcium sulfide, strontium sulfide, potassium sulfide or the like; or a combination of a heavy metal salt of an organic acid and an organic chelating agent, such as s-diphenylcarbazide, diphenylcarbazone or the like.

(D) A combination of a heavy metal sulfate salt, such as a sulfate of silver, zinc, mercury, sodium or the like, and a sulfur-containing compound, such as sodium tetrathionate, soda thiosulfate, thiourea or the like.

(E) A combination of an iron (III) salt of a fatty acid, such as iron (III) stearate, and an aromatic polyhydroxy compound, such as 3,4-hydroxytetraphenylmethane or the like.

(F) A combination of a metal salt of an organic acid, such as silver oxalate, mercury oxalate or the like, and an organic polyhydroxy compound, such as polyhydroxyalcohol, glycerin, glycol or the like.

(G) A combination of an iron (III) salt of a fatty acid, such as iron (III) pelargonate, iron (III) laurylate or the like, and a derivative of thiocesylcarbamide or isothiocesylcarbamide.

(H) A combination of a zinc salt of an organic acid, such as zinc caproate, zinc pelargonate, zinc behenate or the like, and a thiourea derivative, such as ethylenethiourea, N-dodecylthiourea or the like.

(I) A combination of a heavy metal salt of a higher fatty acid, such as iron (III) stearate, copper stearate or the like, and zinc dialkyldithiocarb am ate.

(J) A combination which forms an oxazine dye, such as a combination of resorcinol and a nitroso compound.

(K) A combination of a formazan compound and a reducer and/or a metal salt.

(L) A combination of an oxidization-type color-forming agent and an oxidizer.

(M) A combination of a phthalonitrile and a diiminoisoindoline (i.e., a combination that generates phthalocyanine).

(N) A combination of an isocyanate and a diiminoisoindoline (i.e., a combination that generates a coloring pigment).

(O) A combination of a pigment precursor and an acid or a base (i.e., a combination that generates a pigment).

Among the above-mentioned combinations, the combination of an electron donating dye precursor and an electron accepting compound, a combination of a diazo compound and a coupler compound, a combination of a protected dye precursor and the deprotective agent, and a combination of a paraphenylene diamine derivative or para-aminophenol derivative oxidant precursor and a coupler compound are preferable. That is, as the color-forming component A, the electron donating dye precursor, the diazo compound, the protected dye precursor or the oxidant precursor is preferable. As the compound B or the compound C, the electron accepting compound, the coupler compound or the deprotective agent is preferable.

Next, the photoinitiator used in the light and heat sensitive recording layers (a) through (d) will be explained. The photoinitiator may be used in each of the light and heat sensitive recording layers (a) through (d). The photoinitiator can generate radicals when exposed to light and thereby cause the polymerization reaction within the layer. Further, the photoinitiator can accelerate the polymerization reaction. The recording layer film is cured by the polymerization reaction and thus a latent image of the desired image shape can be formed.

The photoinitiator preferably contains a spectral sensitization compound which has a wavelength of maximum absorption in the range of 300 to 1,000 nm, and a compound that interacts with the spectral sensitization compound. If the compound that interacts with the spectral sensitization compound is a compound which has within its structure both a dye portion having a wavelength of maximum absorption in the range of 300 to 1,000 nm and a borate borate, the spectral sensitization compound is not required. If a color image is to be formed, it is preferable to use a light and heat sensitive recording material that has a light and heat sensitive recording layer which containing the photoinitiator, which contains the spectral sensitization compound and the compound that interacts with the spectral sensitization compound.

As the spectral sensitization compound having a wavelength of maximum absorption at 300 to 1,000 nm, a spectral sensitization compound having a wavelength of maximum absorption in this wavelength range is preferable. High sensitivity can be obtained by selecting any desired dye from among spectral sensitization dyes of the aforementioned wavelength range, and adjusting the light-sensitivity wavelength to correspond to a light source to be used. The light source for image exposure can be appropriately selected from blue, green and red light sources and infrared lasers and the like. Accordingly, for example, in a case of forming a color image, in the light and heat sensitive recording material, which is formed by superposing monochrome light and heat sensitive recording layers that form the colors yellow, magenta and cyan, spectral sensitization dyes having different absorption wavelengths are present in the respective monochrome layers having different color-forming hues. By using light sources corresponding to the absorption wavelengths, because each layer (each color) in the recording material formed by superposing the plurality of layers has high sensitivity, an image with high sharpness can be formed. Thus, sensitivity enhancement and sharpness enhancement can be achieved for the whole multicolor light and heat sensitive recording material. Due to addition of the spectral sensitization dye, a desired color-forming density can be obtained at a lower energy.

Known compounds may be used as the spectral sensitization dye. Specific examples of the spectral sensitization dye include dyes disclosed in patent publications such as *Compounds which Interact with Spectral Sensitization Compounds*, described later, Research Disclosure (Vol. 200, December, 1980, Item 20036), *Sensitizers* (edited by Katsumi Tokumaru and Shin Ogawara, published by Kodansha Ltd. Publishers, pp. 160–163 (1987)) and the like. Specifically, a 3-ketocumarin compound disclosed in JP-A No. 58-15603, a thiopyrylium salt disclosed in JP-A No. 58-40302, naphthothiazol merocyanine compounds disclosed in JP-B Nos. 59-28328 and 60-53300, merocyanine compounds disclosed in JP-B Nos. 61-9621, 623842, 59-89303 and 60-60104 may be used. Moreover, dyes described in *Chemistry of Functional Dyes* (published by CMC Publishers, pp. 393–416 (1981)), ColorMaterials, (60 (4) 212–224 (1987)), and the like may also be used. Specific examples include cation methine dyes, cation carbonium dyes, cation quinone imine dyes, cation indoline dyes, cation styryl dyes and the like.

Examples of the spectral sensitization dye include keto dyes such as cumarin (including ketocumarin or sulfonocumarin) dyes, merostyryl dyes, oxonol dyes, hemioxonol dyes and the like; non-keto dyess such as non-ketopolymethine dyes, triarylmethane dyes, xanthene dyes, anthracene dyes, rhodamine dyes, acridine dyes, aniline dyes, azo dyes and the like; non-ketopolymethine dyes such as azomethine dyes, cyanine dyes, carbocyanine dyes, dicarbocyanine dyes, tricarbocyanine dyes, hemicyanine dyes, styryl dyes and the like; and quinone imine dyes such as azine dyes, oxazine dyes, thazine dyes, quinoline dyes, thiazol dyes and the like. Further, dyes disclosed in Japanese Patent Application No. 2000-94431 may also be used.

By appropriately using the spectral sensitization dye, the spectral sensitivity of the photoinitiator can be obtained in a range from UV light to infrared light. The above-mentioned various kinds of spectral sensitization dyes may be used alone or in a combination of two or more kinds. The amount of the spectral sensitization compound used in the light and heat sensitive recording layer is preferably 0.1 to 5% by weight and more preferably 0.5 to 2% by weight of the total amount of the light and heat sensitive recording layer.

One or two or more kinds of compounds which are able to start the photopolymerization reaction of the polymerizable group in the compound B or the compound D (a photo-polymerizable monomer) may be selected and used as the compound that interacts with the spectral sensitization compound. In particular, if this compound is used with the spectral sensitization compound, the compound will be highly sensitive to a light source for exposure that is in the spectral absorption wavelength range of the spectral sensitization compound. Accordingly, sensitivity enhancement can be achieved and generation of radicals can be controlled using a freely selected light source in a range from ultraviolet to infrared.

Specific examples of the compound that interacts with the spectral sensitization compound include organic borate salt compounds and compounds disclosed from paragraph [0145] to paragraph [0151] in Japanese Patent Application No. 11-36308. Among “compounds which interact with the spectral sensitization compound”, organic borate compounds, benzoinethers, S-triazine derivatives having a trihalogen-substituted methyl group, organic peroxides and azinium salt compounds are preferable, and organic borate compounds are more preferable. By using the spectral sensitization compound and the “compound that interacts with the spectral sensitization compound” together, at the time of exposure, radicals can be locally and effectively generated at the exposed portions, and sensitivity enhancement can be achieved.

Examples of the organic borate compounds include organic borate compounds (which may be referred to as “borate compound I” hereinafter) disclosed in JP-A Nos. 62-143044, 9-188685, 9-188686, 9-188710 and the like, or spectral sensitization dye-based borate compounds (which may be referred to as “borate compound II” hereinafter) obtained from cation dyes and the like.

Specific examples of the borate compounds I include, but are not limited to, compounds disclosed from paragraph [0154] to paragraph [0163] in Japanese Patent Application No. 11-36308.

The spectral dye-based organic borate compounds (i.e., borate compounds II) obtained from cation dyes may be used as disclosed in *Chemistry of Functional Dyes* (published by CMC Publishers, pp.393–416 (1981)), *ColorMaterials*, (60 (4) 212–224 (1987)) and the like. Specifically, any cation dyes may be appropriately used that have a wavelength of maximum absorption in the wavelength range of 300 nm or more, preferably in the wavelength range of 400 to 1100 nm. Among cation dyes, cation methine dyes, polymethine dyes, triaryl methane dyes, indoline dyes, azine dyes, xanthene dyes, cyanine dyes, hemicyanine dyes, rhodamine dyes, azamethine dyes, oxazine dyes, acridine dyes and the like are preferable. Cation cyanine dyes, hemicyanine dyes, rhodamine dyes, and azamethine dyes are more preferable. The borate compound II obtained from an organic cation dye can be obtained using the organic cation dye and an organic boron compound anion with reference to a method disclosed in European Patent No. 223,587A1. Specific examples of the borate compound II obtained from cation dyes include, but are not limited to, compounds disclosed from paragraph [0168] to paragraph [0174] in Japanese Patent Application No. 11-36308.

As described above, the borate compound II is a multifunctional compound. In view of obtaining high sensitivity and sufficient decolorizability, it is preferable that the photoinitiator is formed by appropriately combining the spectral sensitization compound and the compound that interacts with the spectral sensitization compound. In this case, the photoinitiator is more preferably a photoinitiator (1), obtained by a combination of the spectral sensitization compound and borate compound I, or more preferably a photoinitiator (2), obtained by a combination of borate compound I and borate compound II. At this time, the usage ratio of the spectral sensitization dye to the organic borate compound in the photoinitiator is very important in view of obtaining sensitivity enhancement and sufficient decolorization due to irradiation of light in the fixing process.

In a case of the photoinitiator (1), in the photoinitiator, in addition to the ratio of the spectral sensitization compound to the borate compound I (=1/1: mole ratio) which ratio is required for the photopolymerization reaction, it is especially preferable that an amount of borate compound I necessary for sufficiently decolorizing the spectral sensitization compound which remains within the layer is added, in view of obtaining sensitivity enhancement and decolorizability. Namely, the ratio of the spectral sensitization dye/borate compound I is preferably 1/1 to 1/50, more preferably 1/1.2 to 1/30 and most preferably 1/1.2 to 1/20. If the ratio is less than 1/1, polymerization reactivity and decolorizability cannot be sufficiently obtained. A ratio of more than 1/50 is not preferable because the coating characteristic may deteriorate.

In the case of the photoinitiator (2), it is especially preferable that the borate compound I and the borate compound II are used in combination such that the borate portion is at least in an equimolar ratio with respect to the dye portion, in view of obtaining sufficient sensitivity enhancement and decolorizability. The ratio of the borate compound I to the borate compound II is preferably 1/1 to 50/1, more preferably 1.2/1 to 30/1 and most preferably 1.2/1 to 20/1. If the ratio is less than 1/1, few radicals are generated, and sufficient polymerization reactivity and decolorizability cannot be obtained. A ratio exceeding 50/1 is not preferable because sensitivity cannot be sufficiently obtained.

The total amount of the spectral sensitization compound and the organic borate compound in the photoinitiator is preferably 0.1 to 10% by weight, more preferably 0.1 to 5% by weight and most preferably 0.1 to 1% by weight, based on the amount used of the compound having a polymerizable group. If the total amount is less than 0.1% by weight, the effects of the present invention cannot be obtained. A total amount exceeding 10% by weight is not preferable because the storage stability may decrease and the coating characteristic may also decrease.

In order to accelerate the polymerization reaction, as an assistant, an oxygen scavenger or a reducing agent, such as a chain transfer agent of an active hydrogen donor or another compound which accelerates the polymerization in a chain-transfer manner, may be added to the photo-polymerizable composition of the light and heat sensitive recording materials (a) through (d). Examples of the oxygen scavenger include phosphines, phosphonates, phosphites, argentous salts and other compounds easily oxidized by oxygen. Specific examples of the oxygen scavenger include N-phenylglycine, trimethylbarbituric acid, N,N-dimethyl-2, 6-diisopropylaniline, and N,N,N-2,4,6-pentamethylanilinic acid. Examples of useful polymerization accelerators include thiols, thioketones, trihalomethyl compounds, lophine dimer compounds, iodonium salts, sulfonium salts, azinium salts, organic peroxides and azides, and the like.

A protective layer may be provided in the light and heat sensitive recording material used with the present invention, if desired. The protective layer may be a single layer structure or may be a laminated structure of two or more layers.

Examples of materials used for the protective layer include water-soluble polymer compounds such as gelatin, polyvinyl alcohol, carboxy modified polyvinyl alcohol, vinyl acetate-acrylamide copolymer, silicon modified polyvinyl alcohol, starch, modified starch, methylcellulose, carboxymethylcellulose, hydroxymethylcellulose, gelatin, gum arabic, casein, a styrene-maleic acid copolymer hydrolysate, a styrene-maleic acid copolymer half ester hydrolysate, an isobutylene-maleic anhydride copolymer hydrolysate, polyacrylamide derivatives, polyvinylpyrolidone, polystyrene sodium sulfonate, sodium alginate and the like; and latexes such as a styrene-butadiene rubber latex, an acrylonitrile-butadiene rubber latex, a methyl acylate-butadiene rubber latex, a vinyl acetate emulsion and the like.

By cross-linking the water-soluble polymer compound used for the protective layer, storage stability can be further improved. In this case, a known cross-linking agent may be used as a cross-linking agent for cross-linking. Specific examples of the cross-linking agent include water-soluble initial condensates such as N-methylolurea, N-methylolmelamine, urea-formaline and the like, dialdehyde compounds such as glyoxal, glutalaldehyde and the like, inorganic cross-linking agents such as boric acid, borax and the like, and polyamide epichlorohydrine and the like.

Further, known pigments, metal soaps, waxes, surfactants and the like may be used in the protective layer. Known LW absorbents and UV absorbent precursors may be added. The coated amount of the protective layer is preferably 0.2 to 5 $g/m^2$ and more preferably 0.5 to 3 $g/m^2$.

The light and heat sensitive recording material used with the present invention is formed by superposing three light and heat sensitive recording layers, yellow, magenta and cyan, on a support. The light and heat sensitive recording material contains microcapsules which contain color-forming components having different color-forming hues. and photo-polymerizable compositions which are sensitive to lights of different wavelengths. Thus, a color image can be formed. By using the spectral sensitization compounds, each of which has a different absorption wavelength, the photo-polymerizable compositions which are sensitive to lights of different wavelengths can be formed. In this case, intermediate layers may be provided between the light and heat sensitive recording layers of the respective colors.

The light and heat sensitive recording layers of the multilyaer light and heat sensitive recording material for color image formation may be obtained, for example, as follows. On a support is provided a first recording layer, which contains micocapsules which contain a color-forming component that forms the color yellow and a photo-polymerizable composition which is sensitive to a central wavelength $\lambda_1$ of a light source. On the first recording layer is provided a second recording layer, which contains micro-capsules which contain a color-forming component that forms the color magenta and a photo-polymerizable composition which is sensitive to a central wavelength λ2. On the second recording layer is provided a third recording layer, which contains microcapsules which contain a color-forming component that forms the color cyan and a photo-polymerizable composition which is sensitive to a central wavelength $\lambda_3$. The light and heat sensitive recording layer may be formed such that a protective layer is provided and intermediate layers are provided between the respective recording layers, if necessary. The central wavelengths $\lambda_1$, $_2$ and $\lambda_3$ of the respective light sources are different from each other.

When image formation is carried out using this multilayer light and heat sensitive recording material for color image formation, in the exposure process, image exposure is carried out using a plurality of light sources having different wavelengths corresponding to the absorption wavelengths of the light and heat sensitive recording layers. As a result, the recording layers having the absorption wavelengths of the light sources selectively form respective latent images. Thus, a multicolor image having high sensitivity and high sharpness can be formed. Further, by irradiating the surface of the light and heat sensitive recording layer with light, coloring of the background portion due to the photoinitiator, such as the spectral sensitization compound remaining within the layers, can be decolorized, and an image with high contrast and high quality can be formed.

In the light and heat sensitive recording material used for the present invention, the electron donating colorless dye or diazonium salt compound (which hereinafter may be occasionally referred to as the color-forming component) is encapsulated in microcapsules before use. Examples of methods of microcapsulation include conventionally known methods.

Examples of these microencapsulation methods include methods described in: U.S. Pat. Nos. 2,800,457 and 2,800, 458, in which coacervation of a hydrophilic wall forming material is utilized; U.S. Pat. No. 3,287,154, UK Patent No. 990443, and JP-B Nos. 38-19574, 42-446 and 42-771, and the like, in which interfacial polymerization is utilized; U.S. Pat. Nos. 3,418,250 and 3,660,304, in which precipitation of a polymer is utilized; U.S. Pat. No. 3,796,669, in which an isocyanate polyol wall material is utilized; U.S. Pat. No. 3,914,511, in which an isocyanate wall material is utilized; U.S. Pat. Nos. 4,001,140, 4,087,376, and 4,089,802, in which a urea/formaldehide type or urea/formaldehyde/ resorcinol type wall forming material is used; U.S. Pat. No. 4,025,455, in which a wall-forming material such as a melamine/formaldehyde resin, hydroxypropyl cellulose or the like is utilized; JP-B No. 36-9168 and JP-A No. 51-9079, in which in situ methods using monomer polymerization are utilized; UK Patent Nos. 952807 and 965074, in which an electrolytic dispersion and cooling method is utilized; U.S. Pat No. 3,111,407 and UK Patent No. 930422, in which a spray drying method is utilized; and the like.

The microencapsulation methods are not limited to the aforementioned methods, but in the light and heat sensitive recording material used for the present invention, in particular, an interfacial polymerization method is preferably used. In this method, an oil phase, which is prepared by dissolving or dispersing a color-forming component in a hydrophobic organic solvent to serve as the core of the capsules, is mixed with an aqueous phase, in which a water-soluble polymer is dissolved, and this mixture is emulsified and dispersed by a homogenizer or the like. Then, a polymer-forming reaction is caused at the interface between the oil phase and the aqueous phase by heating, such that microcapsule walls can be formed of a polymer substance. That is, in the interfacial polymerization method, capsules with a uniform particle diameter can be formed within a short time, and a recording material with excellent storage stability can be obtained.

A reactant which forms the microcapsule wall of the polymer is added within oil droplets and/or outside the oil droplets. Specific examples of the polymer substance include polyurethane, polyurea, polyamide, polyester, polycarbonate, urea-formaldehyde resin, melamine resin, polystyrene, a styrene-methacrylate copolymer, a styrene-acrylate copolymer and the like. Among these polymer substances, polyurethane, polyurea, polyamide, polyester, and polycarbonate are preferable, and polyurethane and polyurea are especially preferable. The above-mentioned polymer substances may be used in a combination of two or more. Examples of the water-soluble polymer include gelatin, polyvinyl pyrolidone, polyvinyl alcohol and the like.

For example, when polyurethane is used as the capsule wall material, microcapsule walls are formed as follows. First, a polyhydric isocyanate and a second material (for example, a polyol or polyamine) which will react with the polyhydric isocyanate to form the microcapsule walls, are mixed with each other in a water-soluble polymer-aqueous solution (aqueous phase) or in an oil medium (oil phase) which is to be encapsulated. Then, the mixture is emulsified and dispersed. Finally, by heating, the polymer forming reaction is caused at the interface between the aqueous phase and the oil phase, such that the microcapsule walls are formed. Examples of the polyhydric isocyanate and the polyol or polyamine which reacts with the polyhydric isocyanate include materials disclosed in U.S. Pat. Nos. 3,281,383, 3,773,695 and 3,793,268, JP-B Nos. 48-40347 and 49-24159, and JP-A Nos. 48-80191 and 48-84086.

When the microcapsules which contain the color-forming component are prepared, the encapsulated color-forming component may be present in the capsules in a liquid state or in a solid state. Examples of solvents which can be used are the same solvents as those used when emulsification-dispersing the photo-curable composition. If the electron donating colorless dye or diazonium salt compound is encapsulated in the capsules in a liquid state, the electron donating colorless dye or diazonium salt compound is encapsulated in a state in which it is dissolved in a solvent. In this case, the amount of the solvent is preferably 1 to 500 parts by weight per 100 parts by weight of the electron donating colorless dye. If the solubility of the electron donating colorless dye or diazonium salt compound to be encapsulated with respect to the solvent is low, a low-boiling-point solvent having high solubility may be used as an assistant. Examples of the low-boiling-point solvent include ethyl acetate, propyl acetate, isopropyl acetate, butyl acetate, methylene chloride and the like.

An aqueous solution in which the water-soluble polymer is dissolved is used as the aqueous phase. The oil phase is charged into the aqueous phase, and then emulsification dispersion is carried out by a homogenizer or the like. The water-soluble polymer enables uniform and easy dispersion, as well as acting as a dispersion medium which stabilizes the emulsification-dispersed aqueous solution. In order to carry out more uniform emulsification dispersion and stabilization, a surfactant may be added to at least one of the oil phase and the aqueous phase. Known surfactants for emulsions may be used as the surfactant. If the surfactant is added, the added amount of the surfactant is 0.1 to 5% and especially preferably 0.5 to 2% with respect to the amount by weight of the oil phase. As a surfactant contained in the aqueous phase, among anionic and ionic surfactants, a surfactant which acts as a protective colloid and does not cause precipitation or aggregation can be appropriately selected and used. Preferable examples of the surfactant include sodium alkyl benzene sulfonate, sodium alkyl sulfate, a sodium salt of dioctyl sulfosuccinate, polyalkylene glycol (for example, polyoxyethylene nonylphenylether) and the like.

As described above, the water-soluble polymer contained as the protective colloid in the aqueous phase mixed with the oil phase may be appropriately selected from known anionic polymers, nonionic polymers and amphoteric polymers. Examples of the anionic polymer include natural polymers and synthetic polymers, and for example, polymers having a —COO— or —$SO_2$— group and the like. Specific examples of anionic polymers include natural polymers such as gum arabic, alginic acid, pectin and the like; semi-synthetic products such as carboxymethylcellulose, gelatin derivatives such as gelatin phthalate and the like, starch sulfate, cellulose sulfate, lignin sulfonic acid and the like; synthetic products such as maleic anhydride (including hydrolysates) copolymers, acrylic acid (methacrylic acid) polymers and copolymers, vinylbenzenesulfonic acid polymers and copolymers, carboxy-modified polyvinylalcohols and the like. Examples of nonionic polymers include polyvinyl alcohol, hydroxyethyl cellulose, methyl cellulose and the like. Examples of amphoteric polymers include gelatin and the like. Of these, gelatin, gelatin derivatives and polyvinyl alcohol are preferable. The water-soluble polymer is used as a 0.01 to 10% by weight aqueous solution.

All components contained in the light and heat sensitive recording layer such as the color-forming component can be used by being solid-dispersed together with, for example, a water-soluble polymer, a sensitizer and other color-forming aids and the like, by a sand mill or the like. However, it is preferable to dissolve a slightly water-soluble or water-insoluble high-boiling-point organic solvent in water in advance, mix this solution with the polymer aqueous solution (aqueous phase) which contains the surfactant and/or the water-soluble polymer serving as the protective colloid, and use this mixed solution as an emulsified dispersion, which is emulsified using a homogenizer or the like. In this case, if necessary, a lowboiling-point solvent may be used as a dissolving aid. All components such as the aforementioned color-forming component can be emulsified and dispersed separately or can be mixed together in advance, dissolved in the high-boiling-point solvent and then emulsification dispersed. The diameter of the particles formed by emulsifying and dispersing is preferably 1 $\mu$m or less.

Emulsification can be easily carried out such that the oil phase containing the aforementioned components and the aqueous phase containing the protective colloid and the surfactant are mixed together using a usual means for emulsifying fine particles, such as high speed stirring, ultrasonic dispersing or the like, for example, a known emulsifying device such as a homogenizer, a Manton Gaulin, an ultrasonic disperser, a dissolver, a KADY mill or the like. After emulsifying, in order to accelerate the capsule wall formation reaction, the emulsion is heated to 30 to 70° C. During the reaction, in order to prevent aggregation of capsules, it is necessary to add water so as to decrease the incidence of capsule collisions, or to stir thoroughly. Further, during the reaction, a dispersion for preventing aggregation may be added separately. It will be observed that carbon dioxide gas is generated as the polymerization reaction proceeds. When generation of the carbon dioxide gas ends, it can be considered that the capsule wall formation reaction has finished. Usually, the microcapsules which encapsulate the desired dye are obtained by reacting for a few hours.

In the light and heat sensitive recording material used with the present invention, the average particle diameter of the microclapsules is preferably 20 μm or less and more preferably 5 μm or less in view of obtaining high resolution. If the diameter of the formed microcapsules is too small, the surface area with respect to a fixed amount of solids will be too large, and a large amount of the wall material will be needed. Thus, the average particle diameter is preferably at least 0. 1 μm.

If a color image is to be formed, the light and heat sensitive recording layers corresponding to the three hues of the light and heat sensitive recording material are formed such that monochrome light and heat sensitive recording layers are superposed on a support. The respective light and heat sensitive recording layers contain microcapsules which contain the electron donating colorless dyes that form color of the different hues and the photo-polymerizable compositions which contain the spectral sensitization dyes having different wavelengths of maximum absorption. When light is irradiated, the photosensitive thermal layers are sensitized by the different wavelengths of the light sources to form a multicolor image.

Intermediate layers may be provided between the respective monochrome light and heat sensitive recording layers for forming the light and heat sensitive recording layers. The intermediate layer is formed mainly of a binder and may contain, as necessary, additives such as a curing agent, a polymer latex and the like.

In the light and heat sensitive recording material used with the present invention, a binder for each of the layers, including the protective layer, the photosensitive thermal layers, the intermediate layers and the like can be, besides the binder used for emulsification dispersing the photopolymerizable composition and the water-soluble polymer used for encapsulating the color-forming component, a solvent-soluble high polymer such as polystyrene, polyvinylformal, or polyvinylbutyral; an acrylic resin, such as polymethyl acrylate, polybutyl acrylate, polymethyl methacrylate, polybutyl methacrylate and copolymers thereof; a phenol resin, a styrene/butadiene resin, ethyl cellulose, an epoxy resin, a urethane resin, or the like; and high polymer latexes of these can be used. Among these binders, gelatin and polyvinyl alcohol are preferable.

Various surfactants may be used for each light and heat sensitive recording layer of the light and heat sensitive recording material of the present invention, for purposes such as coating assistance, static prevention, lubricity improvement, emulsification for dispersion, adhesion prevention, and the like. Examples of surfactants include non-ionic surfactants such as saponin and polyethylene oxide derivatives such as polyethylene oxide, alkyl ether of polyethylene oxide, and the like; anionic surfactants such as alkyl sulfonate, alkylbenzene sulfonate, alkylnaphthalene sulfonate, alkylsulfuric acid ester, N-acyl-N-alkyltaurines, sulfosuccinate ester, sulfoalkylpolyoxyethylenealkyl phenyl ether, and the like; amphoteric surfactants such as alkylbetaines, alkylsulfobetaines and the like; and cationic surfactants such as aliphatic groups, aromatic quaternary ammonium salts and the like.

In addition to the aforementioned additives, other additives may be added to the light and heat sensitive recording layers as necessary. Examples of the additives include a dye, a UV ray absorber, a plasticizer, a fluorescent whitening agent, a matting agent, a coating assistant, a curing agent, an antistatic agent, a slip-improving agent and the like. Typical examples of these additives are described in *Research Disclosure*, Vol. 176 (December, 1978, Item 17643) and *Research Disclosure*, Vol. 187 (November, 1978, Item 18716).

In the light and heat sensitive recording material of the present invention, a curing agent may be used, as necessary, in the respective layers, such as the light and heat sensitive recording layers, the intermediate layers, the protective layer and the like. In particular, it is preferable to use a curing agent in the protective layer, to decrease viscosity of the protective layer. Examples of the curing agent include "gelatin curing agents" used for manufacturing photographic photosensitive materials, such as formaldehyde-based compounds such as formaldehyde, glutaraldehyde and the like, a reactive halogen compound disclosed in U.S. Pat. No. 3,635,718, compounds having a reactive ethylene unsaturated group disclosed in U.S. Pat. No. 3,635,718, an azirizine-based compound disclosed in U.S. Pat. No. 3,017,280, an epoxy-based compound disclosed in U.S. Pat. No. 3,091,537, halogenocarboxyaldehydes such as mucholoric acid, dioxanes such as dihydrodioxane, dichlorodioxane and the like, vinylsulfones disclosed in U.S. Pat. Nos. 3,642,486 and 3,687,707, vinylsulfone precursors disclosed in U.S. Pat. No. 3,841,872 and ketovinyls disclosed in U.S. Pat. No. 3,640,720. Examples of inorganic curing agents are chrome alum, zirconium sulfate, boric acid and the like. Among these curing agents, 1,3,5-triacryloyl-hexahydro-s-triazine, 1,2-bisvinylsulfonylmethane, 1,3-bis(vinylsulfonylmethyl) propanol-2, bis(α-vinylsulfonylacetoamide)ethane, 2,4-dichloro-6-hydroxy-s-triazine/sodium salt, 2,4,6-triethyleneimino-s-triazine, boric acid and the like are preferable. The added amount of the curing agent is preferably 0.5 to 5% by weight with respect to the amount of the binder.

The light and heat sensitive recording material used for the present invention can be formed such that after preparing coating liquids for the light and heat sensitive recording layers, a coating liquid for a heat-bonding layer and the like using means for dissolving the respective components in the solvents as necessary, the layers are coated on a desired support and dried.

Examples of a solvent used for preparation of a coating liquid include water; alcohols such as methanol, ethanol, n-propanol, isopropanol, n-butanol, sec-butanol, methyl cellosolve, and 1-methoxy-2-propanol; halogen solvents such as methylene chloride and ethylene chloride; ketones such as acetone, cyclohexanone, and methyl ethyl ketone; esters such as methyl acetate cellosolve, ethyl acetate, and methyl acetate; toluene; xylene, and the like. These solvents may be used either singly or in a combination of two or more. Among these, water is particularly preferable.

The coating liquid for each light and heat sensitive recording layer is applied to the support with a blade coater, a rod coater, a knife coater, a roll doctor coater, a reverse roll coater, a transfer roll coater, a gravure coater, a kiss roll coater, a curtain coater, an extrusion coater, or the like. The method of application may be effected with reference to *Research Disclosure*, Vol. 200 (December, 1980, Item 20036, page XV). The thickness of the light and heat sensitive recording layer is preferably 0.1 to 50 μm and more preferably 5 to 35 μm.

Examples of the support used for the light and heat sensitive recording material of the present invention include paper; synthetic papers such as coated paper, laminated paper and the like; films such as polyethylene terephthalate film, cellulose triacetate film, polyethylene film, polystyrene film, polycarbonate film and the like; plates of metals such as aluminum, zinc, copper and the like; and supports on whose surfaces various treatments, such as surface processing, undercoating, metal deposition or the like, have been carried out. The supports disclosed in *Research Disclosure*, Vol. 200 (December, 1980, Item 20036, page XVII) may be used. Further, a polyurethane sheet, a rubber sheet or the like, which has inherent elasticity, may be used. Further, if necessary, an anti-halation layer may be provided on the surface of the support to be used. A sliding layer, an anti-static layer, a curl preventing layer, an adhesive layer and the like may be provided on a back surface of the support.

In the present invention, in addition to light and heat sensitive recording materials that have the above-described light and heat sensitive recording layers (a) through (d), light and heat sensitive recording materials including light and heat sensitive recording layers (e) and (f) may be appropriately used. The light and heat sensitive recording layers (e) and (f) are as follows.

The photo-curable photosensitive thermal layer (e) includes an oxidant precursor E which is encapsulated in thermally-responsive microcapsules, an activator G which exists outside the thermally-responsive microcapsules and which reacts with the oxidant precursor E to generate an oxidant F, and a dye forming coupler H which couples to the oxidant F to generate a dye. By irradiation of light, an irradiated portion of the light and heat sensitive recording layer (e) is cured.

The light and heat sensitive recording layer (f) includes the oxidant precursor E, outside the thermally-responsive microcapsules, the activator G which is encapsulated in the thermally-responsive microcapsules and which reacts with the oxidant precursor E to generate the oxidant F, and the dye forming coupler H which couples to the oxidant F to form a dye. By irradiation of light, an irradiated portion is cured.

In the light and heat sensitive recording layer (e), by carrying out exposure of the desired image shape, the irradiated portion is cured and a latent image of the desired image shape is formed. Next, the activator G present in the unexposed portion moves within the recording material due to heating, and reacts with the oxidant precursor E within the capsules to generate the oxidant F. The generated oxidant F couples to the dye forming coupler H to form a dye (to form color). Accordingly, the light and heat sensitive recording layer (e) is a positive light and heat sensitive recording layer in which color is not formed at the exposed portion and uncured portions, the unexposed portion, form color so that an image is formed. Examples of such a light and heat sensitive recording layer include a light and heat sensitive recording layer disclosed in Japanese Patent Application No. 11-324548, which layer contains a para-phenylenediamine derivative or para-aminophenol derivative oxidant precursor which is encapsulated in microcapsules, a dye forming coupler, an activator which exists outside the microcapsules and which reacts with the oxidant precursor to form a para-phenylenediamine derivative or para-aminophenol derivative oxidant, a photo-polymerizable monomer, and a photoinitiator. In this light and heat sensitive recording layer, the photo-polymerizable monomer is polymerized and cured by exposure, so that a latent image is formed. Thereafter, the activator present at the unexposed portion moves within the recording material when heated, and reacts with the para-phenylenediamine derivative or para-aminophenol derivative oxidant precursor within the microcapsules to generate, within the microcapsules, the para-phenylenediamine derivative or para-aminophenol derivative oxidant, which is a color-forming developing agent. The color-forming developing agent oxidant further reacts with the dye forming coupler within the microcapsules to form color. Thus, color is not formed at the cured latent image portion of the exposed portion and only the uncured portions form color, so that a positive image with high contrast and high sharpness can be formed.

In the light and heat sensitive recording layer (f), by effecting exposure of the desired image shape, the irradiated portion of the layer is cured, so that a latent image of the desired image shape is formed. Next, the oxidant precursor E present at the unexposed portion moves within the recording material during heating, and reacts with the activator G within the microcapsules to generate the oxidant F. The generated oxidant F couples to the dye forming coupler H to form a dye (to form color). Accordingly, the light and heat sensitive recording layer (f is a positive light and heat sensitive recording layer in which color is not formed at the exposed portion and color is formed at the uncured portions, the unexposed portion, so that an image is formed. Specific examples of such a light and heat sensitive recording layer include a light and heat sensitive recording layer disclosed in Japanese Patent Application No. 11-324548, which layer contains a para-phenylenediamine derivative or para-aminophenol derivative oxidant precursor outside microcapsules, an activator which is encapsulated in the microcapsules and which reacts with the oxidant precursor to generate a para-phenylenediamine derivative or para-aminophenol derivative oxidant, a dye-forming coupler, a photo-polymerizable monomer, and a photoinitiator. In this light and heat sensitive recording layer, the photo-polymerizable monomer is polymerized and cured by exposure, so that a latent image is formed. Thereafter, the para-phenylenediamine derivative or para-aminophenol derivative oxidant precursor which exists at the exposed portion is moved within the recording material by heating, and reacts with the activator within the microcapsules so as to generate, within the microcapsules, the para-phenylenediamine derivative or para-aminophenol derivative oxidant, which is a color-forming developing agent. The color-forming developing agent oxidant further reacts with the dye forming coupler within the microcapsules to form color. Accordingly, color is not formed at the cured latent image portion of the exposed portion, and only the uncured portions form color, so that a positive image with high contrast and high sharpness can be formed.

Hereinafter, components for forming the above-described light and heat sensitive recording layers (e) and (f) will be explained in detail. The oxidant F generated in the light and heat sensitive recording layers (e) and (f) is a color-forming developing agent oxidant. As the oxidant precursor E, a compound represented by the following general formula (2) may be used:

General formula (2)

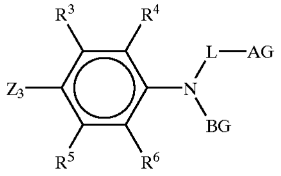

in which $Z_3$ represents a hydroxyl group or $—NR_1R_2$, and $R_1$ and $R_2$ each represents an alkyl group or an aryl group. Examples of $R_1$ and $R_2$ include a methyl group, an ethyl group, a propyl group, a dodecyl group, a 2-hydroxyethyl group, 2-cyanoethyl group, a cyanomethyl group, a 2-methoxyethyl group, a 2-ethoxycarbonylethyl group, a 2-(methylsulfonylamino) ethyl group, a phenyl group, a naphthyl group, and the like. $R_1$ and $R_2$ may bind to form a ring. In this case, the ring is preferably a five member ring, a six member ring or a seven member ring. If $Z_3$ represents a hydroxyl group, the hydroxyl group may be protected and used, if necessary. $R^3$,$R^4$, $R^5$ and $R^6$ each represents a hydrogen atom or a substituent. If $R^3$,$R^4$, $R^5$ or $R^6$ represents the substituent, examples of such a substituent include a halogen atom, an alkyl group, an aryl group, a hetero ring group a carbonamide group, a sulfonamide group, an alkoxy group, a teryloxy group, an alkylthio group, an arylthio group, an amino group, a carbamoyl group, a sulfamoyl group, a cyano group, a sulfonyl group, an alkoxycarbonyl group, an aryloxycarbonyl group, an acyl group, a ureido group, a urethane group, an acyloxy group and the like. $R^1$ and $R^3$, $R^1$ and $R^5$, $R^2$ and $R^3$ and $R^2$ and $R^5$ may bond with each other to form a hetero ring. In this case, the hetero ring is preferably a five member ring, a six member ring or a seven ring member. Further, $R^3$ and $R^4$, and $R^5$ and $R^6$ may bind with each other to form a ring. In this case, the ring may be a hetero ring or may be a carbon ring. Further, the ring may be a saturated ring, a partially unsaturated ring or an unsaturated ring, and the number of members in the ring is preferably five, six or seven.

—L—AG corresponds to the protective group, and AG represents a group which can interact with the activator. Examples of such a group include a carboxy group, a thiocarbonyl group, a selenocarbonyl group, a tellurocarbonyl group, a thioethyl group, a selenoether group, an amino group, an ether group, a hydroxy group (including enol and phenol), a carboamide group, a polyether group, a crown ether group, an azo group, a hydroxyimino group, an imino group, a carbonyl group, a hetero ring group containing a nitrogen atom or a sulfur atom within the ring, and the like. Among these, the carboxyl group, the thiocarbonyl group, the thioether group, the amino group, the hydroxy (including enol and phenol) group, the polyether group, the crown ether group, the hydroxyimino group, the imino group, and the hetero ring group including a nitrogen atom or a sulfur atom within the ring are more preferable. Further, the carboxyl group, the thiocarbonyl group, the amino group, the hydroxyimino group, and the hetero ring group including a nitrogen atom or a sulfur atom within the ring are most preferable. The aforementioned groups may be used in combination. A group which has the partial structure represented by the following general formula (3) is most preferable as AG:

General formula (3)

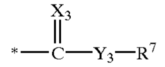

in which ★ represents a site which combines with L. $X_3$ represents a sulfur atom, a selenium atom or an =NOH group. $Y_3$ represents a sulfur atom, an oxygen atom, $—N(R_8)—$ or $—C(R_9)(R_{10})—$. More preferably, $Y_3$ represents a sulfur atom, an oxygen atom or $—N(R_8)—$. $R^7$ represents an alkyl group, an aryl group or a hetero ring group. $R^8$, $R^7$ and $R^{10}$ each represents an alkyl group, an aryl group or a hetero ring group. $R^7$ and $R^8$, $R^7$ and $R^9$, $R^7$ and $R^{10}$, and $R^9$ and $R^{10}$ may bind with each other to form a ring. In this case, the number of members in the ring is preferably five, six or seven.

L represents a group which liberates a nitrogen atom with a bonding electron pair in general formula (2) as a result of interaction between the compound represented by the general formula (2) and the activator. Preferably, L represents a sulfur atom, $—N(R^{41})—$ or $—C^{42})(R^{43})—$. $R^{41}$ represents an alkyl group, an aryl group, a hetero ring group or a bonding arm. $R^{41}$ may bond to AG to form a ring. In this case, a preferable number of members in the ring is five, six or seven. $R^{42}$ and $R^{43}$ represent an alkyl group, an aryl group, a hetero ring group, a cyano group, a trifluoromethyl group, a sulfonyl group, a carbamoyl group, a halogen atom, an amide group, a sulfamoyl group, an acyl group or a bonding arm. $R^{42}$ and $R^{43}$, $R^{42}$ and AG, and $R^{43}$ and AG may bind with each other to form a ring. In this case, a preferable number of members in the ring is five, six or seven. At least one of $R^{42}$ and $R^{43}$ represents a group having a Hammett constant $\sigma_p$ (sigma para) of at least +0.3 (preferably a cyano group, a trifluoromethyl group, a sulfonyl group, a carbamoyl group or a sulfamoyl group (an acyl group or the like)).

In general formula (2), BG represents a block group, a group which is liberated in a process of dye formation. BG also has a function of stabilizing the compound represented by general formula (2) and, in view of this function, preferably represents an electron absorbing group. Preferable examples of BG include groups represented by the general formula (4), $$★★—W—R^{45}$$ General formula (4)

in which ★★ represents a position at which BG binds to a nitrogen atom in general formula (2). W represents a bivalent group having an electron absorbing property, such as $—SO_2—$,$—CON(R^{45})—$, $—COO—$ or $—SO_2N(R^5)—$. $R^{45}$ represents a hydrogen atom, an alkyl group or an aryl group, of which the hydrogen atom is preferable. W represents $—CON(R^{45})—$. $R^{44}$ represents an alkyl group, an aryl group, a hetero ring group or an alkoxy group, more preferably represents an alkyl group or an aryl group, and most preferably represents an alkyl group.

The amount of the oxidant precursor E used for one color is preferably in a range of 0.01 to 5 mmol/$m^2$ and more preferably in a range of 0.1 to 2 mmol/$m^2$. Specific examples of the oxidant precursor E represented by general formula (2) are described from paragraph [0015] to paragraph [0023] in Japanese Patent Application No. 11-324548.

Next, the activator G is explained. The activator G reacts with the para-phenylene dia mine derivative or para-aminophenol derivative oxidant precursor to generate the para-phenylenediamine derivative or para-aminophenol derivative oxidant. Examples of the activator include an electrophilic agent and, especially, an electrophilic agent which utilizes a nucleophilic substitution reaction or a nucleophilic addition reaction of the oxidant precursor with a carbon atom contained in the electrophilic agent. Examples of such an activator include substances having structures represented by the following general formulae:

$Q\text{-}CR^{55}R^{56}R^{57}$, $R^{58}R^{59}C{=}O$, $R^{60}R^{61}C{=}CRR^{62}R^{63}$, $R^{64}R^{65}C{=}NR^{66}$, $R^{67}N{=}C{=}O$, $R^{63}R^{69}C{=}C{=}O$, and $R^{70}R^{71}C{=}C{=}CR^{72}R^{73}$ in which Q represents an atom or a group which is liberated by a nucleophilic reaction of AG of the oxidant precursor E represented by general formula (2) with respect to a bound carbon atom of Q. Examples of Q include a halogen atom, an alkylsulfoxyl group, an arylsulfoxyl group, and a carbamoyloxyl group. $R^{55}$ to $R^{75}$ represent a halogen atom or a substituent. Preferably at least one of $R^{60}$ to $R^{63}$ represents an electron absorbing group. Preferably at least one of each of $R^{55}$ to $R^{57}$, $R^{58}$, to $R^{59}$, and $R^{64}$ to $R^{66}$, and at least two of $R^{60}$ to $R^{63}$ represents an electron absorbing group. Further, the activator preferably has at least one polymerizable group.

Another preferable example of the activator G is a compound represented by general formula (5), $[A_1,]a\text{-}Mb+$ General Formula (5)

in which M represents a metallic atom having an electric charge of b valence, and a represents an integer from 0 to 7. Preferable examples of the metallic atom which is preferable as M include titanium, vanadium, chromium, manganese, iron, cobalt, nickel, copper, zinc, zirconium, molybdenum, ruthenium, rhodium, palladium, silver, cadmium, mercury, tin, tungsten, rhenium, osmium, iridium, platinum, gold, mercury, thallium, lead and uranium.

Al represents an atomic group which neutralizes the electric charge of the metallic atom. Examples of $A_1$ include organic anions such as carbonic acid anions, sulfonic acid anions, sulfuic acid mono ester anions, phosphoric acid diester anions, β-ketoesters anions, β-diketone anions, oxime anions, hydroxamic acid anions, tetraphenyl boric acid anions, and inorganic anions such as a phosphorus 6-fluoride anion, phosphorus 4-fluoride anion or the like.

In general formula (5), if b=0, $A_1$ need not neutralize the electric charge of M, and a represents 0 to 6. At this time, $A_1$ preferably represents a phosphine such as triphenyl phosphine. Specific examples of the above-described activator G are described in paragraph [0025] and from. paragraph [0029] to paragraph [0032] of JP-A No. 11-324548.

Examples of the activator G include compounds represented by general formula (6), $(Mk+)q\cdot(A_2)m(B_2)n$ General Formula (6)

in which M represents a metallic atom having an electric charge of k valence. k represents an integer from 0 to 7. q represents an integer from 1 to 24. $A_2$ represents an atomic group which has a negative electric charge from 1 to 7 valence and which neutralizes the electric charge of the metallic atom M. m represents an integer from 0 to 24. If m is at least 2, the $A_2$s may be the same as or may be different from each other, and may connect with each other. $B_2$ represents an atomic group represented by the following general formula (7), and n represents an integer from 1 to 24:

General formula (7)

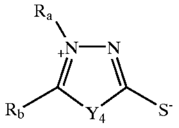

in which $Y_4$ represents O, S or N-$R_c$, and $R_a$ and $R_c$ represent substituents. $R_b$ represents a hydrogen atom or a substituent.

If n represents at least 2, the $B_2$s may be the same as or may be different from each other, and may connect with each other. The compound represented by general formula (6) may further be bound to an atomic group which does not substantially neutralize other electric charges.

As the dye forming coupler H, couplers which are known as four-equivalent couplers and two-equivalent couplers in the field of silver halide photography photosensitive materials may be used. A two-equivalent coupler is preferable. In the oxidant precursor E represented by general formula (2), if W in BG is —$SO_2$—, a four-equivalent coupler is preferably used. With regard to such a dye forming coupler H, the coupler description in JP-A No. 8-286340 may be applied and disclosed couplers may be preferably used. More preferable examples of the coupler may also be used. Specific examples of compounds in JP-A No. 8-286340 may also be used.

The oxidant precursor F and the dye forming coupler H may be used at a freely selected molar ratio. The molar ratio (oxidant precursor/dye forming coupler) is preferably 0.01 to 100, more preferably 0.1 to 10 and most preferably 0.5 to 5. The oxidant precursor E and the activator G may be used at a freely selected molar ratio. The molar ratio (activator/oxidant precursor) is preferably 0.1 to 100, more preferably 0.2 to 50 and most preferably 0.5 to 50. Two or more kinds of each of the oxidant precursor E, the activator G and the dye forming coupler H may be mixed together and used.

As in the light and heat sensitive recording layers (b) to (d), by adding the photo-polymerizable compound D and the photoinitiator to the light and heat sensitive recording layers (e) and (f), a photo-curable light and heat sensitive recording layer can be formed. Further, a photo-curable light and heat sensitive recording layer can also be formed by making one of the oxidant precursor E, the activator G and the dye forming coupler H have a polymerizable group. By using, as the photo-polymerizable compound, the photo-polymerizable compound Dp, which has a strong interaction with either the oxidant F or the dye forming coupler H, a negative image can be obtained.

The same photo-polymerizable compound D and the photoinitiator as those used in the light and heat sensitive recording layers (b) to (d) may be used. Additives for the light and heat sensitive recording layer, structures of layers other than the light and heat sensitive recording layer and encapsulating methods have been already described.

In accordance with the present invention, an image can be recorded on a light and heat sensitive recording material in a completely dry system which does not produce waste. In addition, the exposed light and heat sensitive recording material, before being developed, is heated in the moisture content-controlling section so as to evaporate moisture from the recording material, and the moisture content thereof is suitably controlled for preventing uneven development. Accordingly, the developed material is free from the problem of image mottling caused by moisture in thermal development, and good print images with no mottling can be obtained.

In the moisture content-controlling section, when the recording material is heated on the surface opposite to the exposed surface, moisture ecan be more readily evaporated away. Accordingly, the treatment for moisture content control of the recording material can be effected within a short period of time, and good print images without mottling can be obtained efficiently.

In the case where vapor from the heated light and heat sensitive recording material is discharged through an exhaust section by suction, the vapor is prevented from staying or condensing in the apparatus, and causing problems in the apparatus, and the apparatus ensures stable image formation.

What is claimed is:

1. An image-recording apparatus comprising:

a casing section which encases a light and heat sensitive recording material;

an optical recording section, downstream of the casing section, which exposes the light and heat sensitive recording material, which has been fed from the casing section, for recording a latent image;

a thermal developing section, downstream of the optical recording section, which develops the latent image by heating;

a moisture content-controlling section, upstream of the thermal developing section, which controls moisture content of the light and heat sensitive recording material after exposure; and an optical fixing section, which is positioned downstream of the thermal developing section so as to receive the light and heat sensitive recording material from the thermal developing section, and which irradiates light onto the light and heat sensitive recording material for fixing a developed image onto the heat sensitive recording material.

2. The image-recording apparatus as claimed in claim 1, wherein the moisture content-controlling section comprises at least one of a heating device that heats the light and heat sensitive recording material and a moistening device that moistens the light and heat sensitive recording material.

3. The image-recording apparatus as claimed in claim 1, wherein the moisture content-controlling section comprises:

a moisture content-measuring device that measures the moisture content of the light and heat sensitive recording material for generating a measurement signal; and a moisture content-controlling device that controls the moisture content of the light and heat sensitive recording material by at least one of heating and moistening on the basis of the measurement signal of the moisture content-measuring device.

4. The image-recording apparatus as claimed in claim 2, wherein the moisture content-controlling section comprises:

a moisture content-measuring device that measures the moisture content of the light and heat sensitive recording material for generating a measurement signal; and a moisture content-controlling device that controls the moisture content of the light and heat sensitive recording material by at least one of heating and moistening on the basis of the measurement signal of the moisture content-measuring device.

5. The image-recording apparatus as claimed in claim 1, wherein the light and heat sensitive recording material is, heated from a side thereof which is opposite to an exposure surface side thereof.

6. The image-recording apparatus as claimed in claim 2, wherein the light and heat sensitive recording material is heated from a side thereof which is opposite to an exposure surface side thereof.

7. The image-recording apparatus as claimed in claim 3, wherein the light and heat sensitive recording material is heated from a side thereof which is opposite to an exposure surface side thereof.

8. The image-recording apparatus as claimed in claim 4, wherein the light and heat sensitive recording material is heated from a side thereof which is opposite to an exposure surface side thereof.

9. The image-recording apparatus as claimed in claim 3, wherein the moisture content-controlling device controls the moisture content of the light and heat sensitive recording material such that a measurement value from the moisture content-measuring device approaches a setting value.

10. The image-recording apparatus as claimed in claim 4, wherein the moisture content-controlling device controls the moisture content of the light and heat sensitive recording material such that a measurement value from the moisture content-measuring device approaches a setting value.

11. The image-recording apparatus as claimed in claim 7, wherein the moisture content-controlling device controls the moisture content of the light and heat sensitive recording material such that a measurement value from the moisture content-measuring device approaches a setting value.

12. The image-recording apparatus as claimed in claim 8, wherein the moisture content-controlling device controls the moisture content of the light and heat sensitive recording material such that a measurement value from the moisture content-measuring device approaches a setting value.

13. The image-recording apparatus as claimed in claim 1, further comprising an exhaust device that sucks and discharges vapor.

14. The image-recording apparatus as claimed in claim 2, further comprising an exhaust device that sucks and discharges vapor.

15. The image-recording apparatus as claim ed in claim 3, further comprising an exhaust device that sucks and discharges vapor .

16. The image-recording apparatus as claimed in claim 4, further comprising an exhaust device that sucks and discharges vapor.

* * * * *